(12) United States Patent
Short et al.

(10) Patent No.: US 8,249,374 B2
(45) Date of Patent: Aug. 21, 2012

(54) SYSTEMS AND METHODS FOR ADAPTIVE MULTIRESOLUTION SIGNAL ANALYSIS WITH COMPACT CUPOLETS

(75) Inventors: Kevin M. Short, Durham, NH (US); Kourosh Zarringhalam, Nashville, TN (US)

(73) Assignee: University of New Hampshire, Durham, NH (US)

( * ) Notice: Subject to any disclaimer, the term of this patent is extended or adjusted under 35 U.S.C. 154(b) by 1273 days.

(21) Appl. No.: 12/001,961

(22) Filed: Dec. 12, 2007

(65) Prior Publication Data

US 2008/0152141 A1    Jun. 26, 2008

Related U.S. Application Data

(60) Provisional application No. 60/874,582, filed on Dec. 12, 2006, provisional application No. 60/899,722, filed on Feb. 5, 2007.

(51) Int. Cl.
 *G06K 9/46* (2006.01)
(52) U.S. Cl. ....................................... 382/240
(58) Field of Classification Search ................... 382/240
See application file for complete search history.

(56) References Cited

U.S. PATENT DOCUMENTS

| | | | |
|---|---|---|---|
| 5,550,924 A * | 8/1996 | Helf et al. | 381/94.3 |
| 5,818,712 A * | 10/1998 | Glenn et al. | 700/54 |
| 6,212,239 B1 * | 4/2001 | Hayes | 375/259 |
| 6,631,166 B1 * | 10/2003 | Carroll | 375/259 |
| 7,110,547 B2 * | 9/2006 | Short | 380/263 |
| 7,286,670 B2 * | 10/2007 | Short | 380/263 |
| 2003/0169940 A1 * | 9/2003 | Short | 382/249 |
| 2004/0177310 A1 * | 9/2004 | Mohan et al. | 714/776 |
| 2006/0002554 A1 * | 1/2006 | Kim et al. | 380/263 |
| 2006/0269057 A1 * | 11/2006 | Short et al. | 380/228 |
| 2007/0053517 A1 * | 3/2007 | Short | 380/263 |
| 2008/0152141 A1 * | 6/2008 | Short et al. | 380/263 |

FOREIGN PATENT DOCUMENTS

| | | |
|---|---|---|
| WO | WO 01/99315 A2 | 12/2001 |
| WO | WO 02/065386 A | 8/2002 |
| WO | WO 2006/128144 | 11/2006 |

OTHER PUBLICATIONS

Kuorosh Zarringhalam, Cupolets: Chaotic Unstable Periodic Orbits Theory and Application, Sep. 2006.*
Beer, T.: Walsh transforms. American Journal of Physics 49 (1981) 466-472.
Coomes, B.A., Koçak, H., Palmer, K.J.: Shadowing orbits of ordinary differential equations. Journal of Computational and Applied Mathematics 52 (1994) 35-43.
Coomes, B.A., Koçak, H., Palmer, K.J.: Long periodic shadowing. Numerical Algorithms 14 (1997) 55-78.

(Continued)

*Primary Examiner* — Jason M Repko
*Assistant Examiner* — Patrick Edwards
(74) *Attorney, Agent, or Firm* — Ropes & Gray LLP

(57) ABSTRACT

Systems and methods for signal analysis using orbits of a chaotic system are provided. For example, a multiresolution analysis may be constructed and cupolets may be used to approximate arbitrary signals and compress images. Cupolets may be phase transformed to produce compact cupolets that are well-suited for producing sharp changes in signals, or to produce compact cupolets that are more oscillatory and have less or no sharp global maximum amplitudes. Alternatively, cupolets may be phase transformed to allow for optimal or near optimal adjustment to fit a signal.

31 Claims, 15 Drawing Sheets

OTHER PUBLICATIONS

Curry, J.H.: An algorithm for finding closed orbits. Global Theory of Dynamical Systems 819 (1979) 111-120.

Grebogi, C., Hammel, S.M., Yorke, J.A., Sauer, T.: Shadowing of physical trajectories in chaotic dynamics: Containment and refinement. Physical Review Letters 65 (1990) 1527-1530.

Gregorio, S.D.: The study of periodic orbits of dynamical systems. The use of a computer. J. Stat. Phys. 38 (1985) 947-972.

Hayes, S., Grebogi, C., Ott, E.: Communicating with chaos. Physical Review Letters 70 (1993) 3031-3034.

Hayes, S., Grebogi, C., Ott, E., Mark, A.: Experimental control of chaos for communication. Physical Review Letters 73 (1994) 1781-1784.

Ott, E., Grebogi, C., Yorke, J.A.: Controlling chaos. Physical Review Letters 64 (1990) 1196-1199.

Parker, A.T.: Topics in Chaotic Secure Communication. PhD thesis, University of New Hampshire (1999).

Petukhov, A.: Periodic discrete wavelets. Algebra i Analiz 8 (1996) 151-183.

Schwartz, I.B.: Estimating regions of existence of unstable periodic orbits using computer-based techniques. SIAM J. Numer. Anal. 20 (1983) 106-120.

Short, K.M., Parker, A.T.: Security issues in chaotic communications. Paper presented at the SIAM Conf. on Dynamical Systems, Snowbird, UT, May 23-27, 1999.

Short, K.M., Garcia, R.A., Daniels, M., Curley, J., Glover, M.: An introduction to the koz scalable audio compression technology. AES 118th Convention preprint:6446 (May 2005).

Short, K.M., Garcia, R.A., Daniels, M.: Scalability in koz audio compression technology. AES 119th Convention preprint:6598 (Oct. 2005).

Short, K.M., Garcia, R.A., Daniels, M.: Multi-Channel Audio Processing Using a Unified Domain Representation, AES 119th Convention (Oct. 2005).

Short, K.M., Garcia, R.A.: Signal Analysis Using the Complex Spectral Phase Evolution (CSPE) Method, AES 120th Convention (May 2006).

Short, K.M., Garcia, R.A.: Accurate Low-Frequency Magnitude and Phase Estimation in the Presence of DC and Near-DC Aliasing, AES 121st Convention (Oct. 2006).

Short, K.M.: Frequency Domain Phase Model of Transient Events, AES 121st Convention (Oct. 2006).

Sparrow, C.: The lorenz equations: Biforcations, chaos, and strange attractors (p. 1-12) (1982).

K. Zarrinhalam, K.M. Short, Generating an adaptive multiresolution image analysis with compact cupolets, vol. 52 No. 1-2, May 5, 2007.

An Introduction to the KOZ Scalable Audio Compression Technology, K.M. Short et al., AES 118th Convention, May 28, 2005.

Scalability in KOZ Audio Compression Technology K.M. Short et al., AES 119th Convention, May 28, 2005.

Sparrow, C. The lorenz equations: Biforcations, chaos, and strange attractors (Applied Mathematical Sciences, vol. 41) (all) (1982).

* cited by examiner

SYSTEMS AND METHODS FOR ADAPTIVE MULTIRESOLUTION SIGNAL ANALYSIS WITH COMPACT CUPOLETS

CROSS-REFERENCE TO OTHER PATENT APPLICATIONS

This application claims the benefit of U.S. Provisional Patent Application No. 60/874,582, filed Dec. 12, 2006, and U.S. Provisional Patent Application No. 60/899,722, filed Feb. 5, 2007, each of which is hereby incorporated by reference herein in its entirety.

FIELD OF THE INVENTION

This can relate to systems and methods for signal analysis using orbits of a chaotic system and, more particularly, to systems and methods for adaptive multiresolution signal analysis using cupolets.

BACKGROUND OF THE DISCLOSURE

Periodic orbits of a chaotic system are a rich source of qualitative information about the dynamical system. For example, the presence of unstable periodic orbits on the attractor is a typical characteristic of a chaotic system. The abundance of unstable periodic orbits have been utilized in a wide variety of theoretical and practical applications for analyzing, compressing, and processing signals. Therefore, it is desirable to be able to provide new and improved systems and methods for analyzing signals using orbits of chaotic systems.

SUMMARY OF THE DISCLOSURE

Systems and methods for signal analysis using orbits of a chaotic system are provided.

According to one embodiment, a method for operating on a cupolet to produce bases for representing a signal includes phase transforming the cupolet into a compact cupolet and extending the compact cupolet non-periodically over the entire real line by defining the compact cupolet to be zero outside the window of the compact cupolet. The method also includes applying a transform to the extended compact cupolet to obtain at least a first basis, using the first basis for a first resolution-level, and selecting at least one basis element from the first basis to approximate the signal at a first resolution.

According to another embodiment, a method for operating on a cupolet to produce bases for representing a signal includes phase transforming the cupolet into a compact cupolet and down-sampling the compact cupolet by a factor of the length of the window of the compact cupolet. The method also includes padding the down-sampled compact cupolet to have the same length as the length of the window of the compact cupolet, extending the padded cupolet periodically to the entire real line, sampling the extended cupolet to obtain at least a first basis, using the first basis for a first resolution-level, and selecting at least one basis element from the first basis to approximate the signal at a first resolution.

According to yet another embodiment, a method for operating on a cupolet to produce bases for representing a signal includes phase transforming the cupolet into a compact cupolet and down-sampling the compact cupolet by a first factor of the length of the window of the compact cupolet to provide a first down-sampled cupolet. The method also includes padding the first down-sampled cupolet to fit in the window of the compact cupolet, shifting the padded first down-sampled cupolet by the first factor to generate at least a first basis, using the first basis for a first resolution-level, and selecting at least one basis element from the first basis to approximate the signal at a first resolution.

According to still yet another embodiment, a method of converting a cupolet from an oscillatory state into a compact state includes phase transforming the cupolet into a compact cupolet by aligning at least a portion of the frequency components of the cupolet around a single global maximum.

BRIEF DESCRIPTION OF THE DRAWINGS

The above and other advantages of the invention will be apparent upon consideration of the following detailed description, taken in conjunction with accompanying drawings, in which like reference characters refer to like parts throughout, and in which.

DETAILED DESCRIPTION OF THE DISCLOSURE

Figure 1:
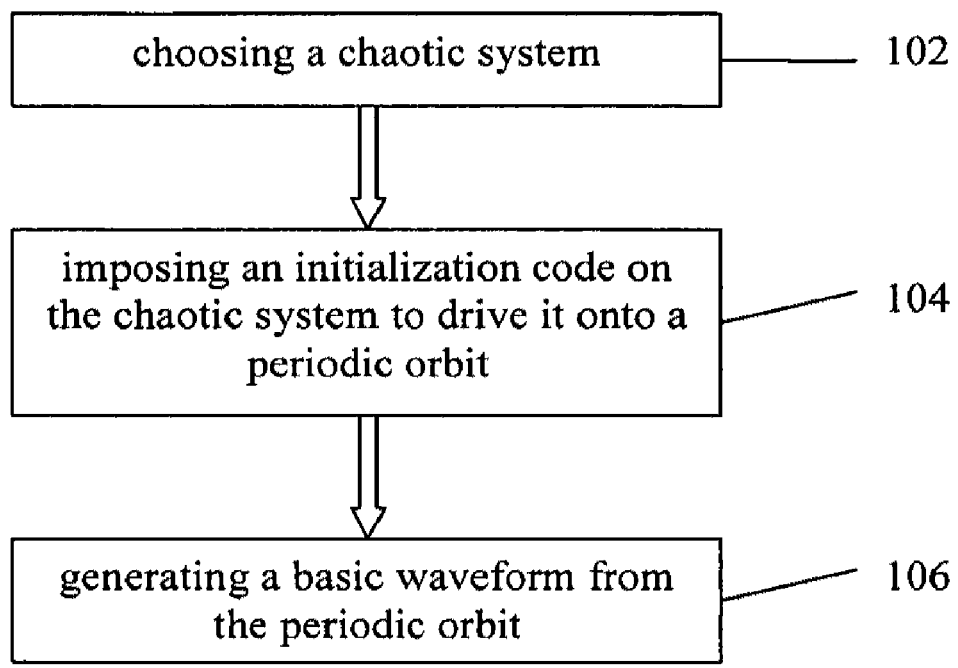
FIG. 1 is a flowchart of an illustrative process for generating controlled stabilized periodic orbits constructed in accordance with the principles of the invention.

Control schemes for stabilizing unstable periodic orbits of a chaotic system are provided herein. The techniques allow for the creation of many periodic orbits. These approximate chaotic unstable periodic orbits may be referred to herein as Chaotic Unstable Periodic Orbits ("cupolets"). These orbits can be passed through a phase transformation to a compact cupolet state that can possess a wavelet-like structure and can be used to construct adaptive bases. This cupolet transformation can be an alternative to Fourier and wavelet transformations. The cupolet transformation can also provide a continuum between Fourier and wavelet transformations, and can be used in a variety of applications, such as data and music compression, as well as image and video processing.

An advantage of using cupolets over traditional Fourier and wavelet transforms for creating adaptive bases in accordance with the invention is that cupolets can be used to generate a wide variety of different wave forms, ranging from a simple sine-like wave with only one dominant spectral line to very complex wave forms with lots of harmonics, for example. These cupolets can be produced with very little information (e.g., using only 16 control bits, although any suitable number of control bits may be used), and mathematically, any complete basis can be used. However, efficiency of a chosen basis for compression purposes may be tied to convergence rates. Real world signals, such as signals obtained from musical instruments and images with edges and discontinuities, may have very complicated spectra. Therefore, using a more complex signal can help to achieve a faster convergence rate.

One chaotic control approach of the invention may be adapted from a communication scheme developed by Hayes, Grebogi, and Ott, as described in more detail below, which uses small perturbations applied on a control surface to steer trajectories of a double scroll oscillator around each of two loops in the attractor, which may be labeled 0 and 1 to correspond to bit values. Therefore, an analog signal may be obtained and the bit value can be determined by observing whether the oscillation is above or below a reference value. "Parker, A. T.: 'Topics In Chaotic Secure Communication,' PhD. thesis, University of New Hampshire (1999)," "Short, K. M., Parker, A. T.: 'Security Issues In Chaotic Communications,' Paper presented at the SIAM Conf. on Dynamical Systems, Snowbird, Utah, May 23-27 (1999)," and "U.S. Pat. No. 7,110,547 entitled "Method and Apparatus for the Compression and Decompression of Image Files Using a Chaotic System," each of which is hereby incorporated by reference herein in its entirety, shows that this scheme can be adapted for secure communication. A receiver can be initialized remotely by sending sequences of initializing codes that can cause a chaotic system to stabilize onto a cupolet, regardless of the initial state of the system.

However, all the different dynamical behaviors of the system may be easily accessible via small controls. The techniques of the invention may be used to produce cupolets that closely approximate periodic orbits of the chaotic system. The orbits may be produced with small perturbations, which in turn may suggest that these orbits are shadowing true periodic orbits.

These cupolets can be utilized in constructing an adaptive multiresolution analysis of signals. Various approaches may be used to approximate arbitrary signals at different resolution-levels according to the invention. Adaptive image compression may provide the ability to access an image at different resolutions, ranging from a low quality image with a small size to a high quality image with a bigger size, for example. The multiresolution analysis may allow for the lowest resolution levels to capture the coarse structure of an image while the finer detail may be carried in the higher resolution levels. This can be useful, for example, in web-based applications. In a progressive download mode, for example, an image can arrive earlier and can be quickly displayed in lower quality and, if the network bandwidth allows, the finer resolution layers can be added as they arrive to provide the fine details. Similarly, smaller images, such as thumb-nails, can be accomplished with coarse resolutions, as their small size may limit the required resolution.

The control schemes may be used to stabilize unstable periodic orbits of a chaotic system, such as a double scroll system. Multiresolution analysis may be constructed such that cupolets of the chaotic system can be used to approximate arbitrary signals and compress images.

In view of the foregoing, systems and methods for signal analysis using orbits of a chaotic system are provided and described with reference to FIGS. 1-15.

FIG. 1 shows an illustrative process 100 for generating controlled stabilized periodic orbits of a chaotic system in accordance with the invention. Control signals can be utilized in a chaotic system to induce the chaotic system to settle onto periodic orbits that would otherwise be unstable (e.g., aperiodic). A control signal may be relatively small in length (e.g., approximately 16 bits), but the resultant periodic waveforms can include more than 200 harmonics in their spectrum. The difference in size between the control signals and the resultant waveforms may be utilized to create a compression scheme. For example, the compression achieved may be related to the ratio of the number of information bits required to define the spectral lines of the waveform and the number of bits required to define the cupolet.

Waveforms produced by the chaotic signal generator may be, for example, cupolets. Cupolets may naturally carry a structure present in various types of signals, such as speech, music, and image signals. Accordingly, cupolets can be used individually, or combined with one another, to model such signals.

Process 100 of FIG. 1 may begin by choosing a chaotic system at step 102. One type of chaotic system is the double-scroll oscillator, which may be defined by the following set of nonlinear differential equations that form a 3-variable system, for example, as described by "S. Hayes, C. Grebogi, and E. Ott: 'Communicating with Chaos,' Phys. Rev. Lett. 70, 3031 (1993)," which is hereby incorporated by reference herein in its entirety:

$$C_1 \frac{dV_{C1}}{dt} = G(V_{C2} - V_{C1}) - g(V_{C1})$$

$$C_2 \frac{dV_{C2}}{dt} = G(V_{C1} - V_{C2}) + i_L$$

$$L \frac{di_L}{dt} = -V_{C2}$$

where $$g(V) = \begin{cases} m_1 V, & -B_p \leq V \leq B_p \\ m_0(V + B_p) - m_1 B_p, & V \leq -B_p \\ m_0(V - B_p) + m_1 B_p, & V \geq B_p \end{cases}$$

Here, g(v) represents a nonlinear negative resistance component, and $C_1$, $C_2$, L, G, $m_0$, $m_1$, and $B_p$ are constant parameters. In some embodiments, these equations can be used to build an analog circuit or a digital circuit. In other embodiments, these equations can be simulated on a computer as software. For example, a programmable logic device may be utilized to embody the equations in hardware. If a circuit is built, the variables $V_{C1}$ and $V_{C2}$ may be voltages, and $i_L$ may be a current. In the equations, the variables may be real and continuous, while the output of a software simulation may produce a sampled waveform.

A chaotic system, such as, for example, a double-scroll oscillator, may settle down to, and may be bounded by, an attractor. The system may regularly settle down to the same attractor no matter what initial conditions were used to set the system. In the 3-variable system provided by the above equations, these attractors may be ribbon-like structures that stretch and fold upon themselves and remain confined to a box. The actual state of the 3-variable system may be determined by the instantaneous value of the system variables (e.g., $V_{C1}$, $V_{C2}$, and $i_L$). The state of the system may be defined by the joint state of the variables (i.e., the state may be a 3-vector) and, therefore, one of the variables may have the same value more than once. But, whenever this occurs, at least one of the other variables may have a different or unique value, such that if we plot the state of the system as a point in three-dimensional space, then no point may be duplicated in some embodiments. Therefore, the values of these variables may never repeat such that an aperiodic system may be provided, for example.

Figure 2:
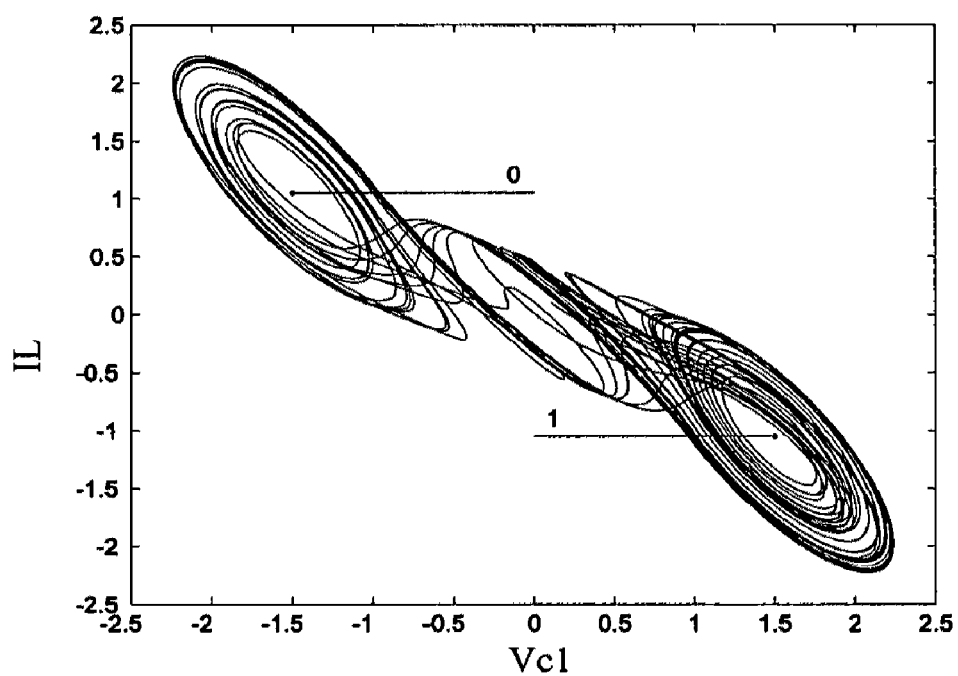
FIG. 2 is a plot of a double scroll oscillator generated from systems and methods constructed in accordance with the principles of the invention.

While the chaotic attractors may be aperiodic structures, the attractors can have an infinite number of unstable periodic orbits embedded within them. Control signals may be provided to stabilize these orbits by perturbing the state of the system in certain fixed locations by a particular amount. Using the above equations as an example, the attractor that results from a numerical simulation using the parameters $C_1=1/9$, $C_2=1$, $L=1/7$, $G=0.7$, $m_0=-0.5$, $m_1=-0.8$, and $B_p=1$ may have two lobes, each of which may surround an unstable fixed point, as shown in FIG. 2.

Because of the chaotic nature of the oscillator's dynamics, it is possible to take advantage of sensitive dependence on initial conditions by carefully choosing small perturbations to direct trajectories around each of the lobes of the attractor. In this way, steering the trajectories around the appropriate lobes of the attractor, suitably labeled 0 and 1 in FIG. 2, for example, can generate a desired bit stream. This makes it possible, through the use of an initialization code, to drive the chaotic system onto a periodic orbit that is used to produce a basic waveform. It should be noted that other embodiments could have more than two lobes, in which each lobe is labeled 0 or 1 or a symbol from any chosen symbol set.

There are a number of ways to control the chaotic oscillator to more precisely specify the bits 0 and 1. In one embodiment, a Poincare surface of section may be defined on each lobe by intersecting the attractor with the half planes $$i_L = \pm GF, |v_{C_1}| \leq F,$$

where $$F = \frac{B_p(m_0 - m_1)}{(G + m_0)}.$$

The lobes and control planes may be assigned values 0 and 1, as shown in FIG. 2, such that a sequence of binary digits may be recorded when a trajectory passes through a control plane.

Figure 3:
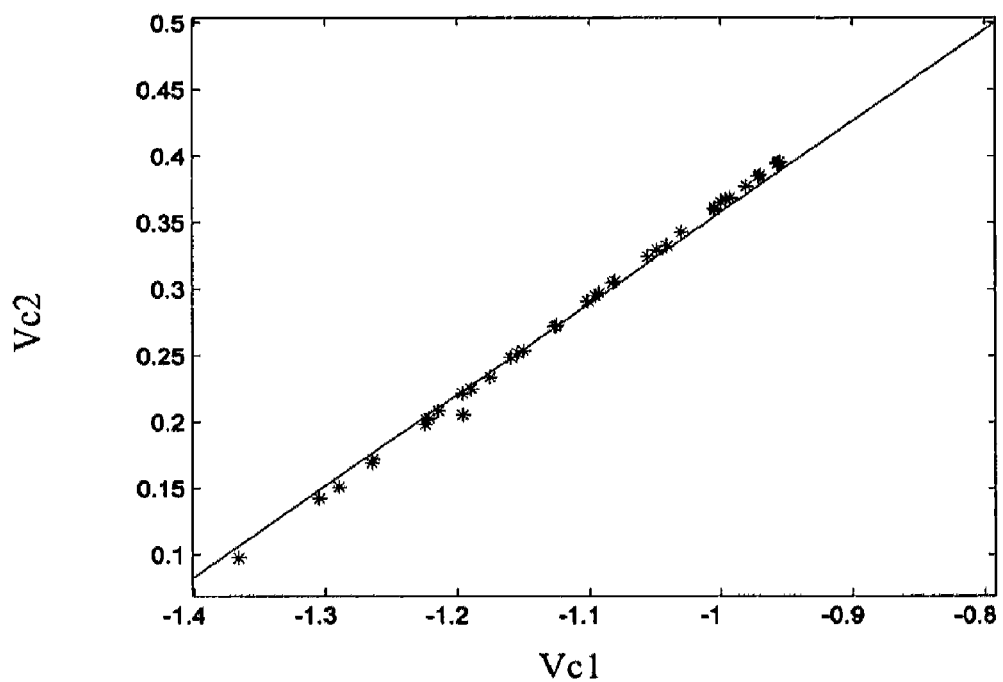
FIG. 3 is a top view of the intersection of a Poincare surface with a portion of the double scroll oscillator of FIG. 2 generated from systems and methods constructed in accordance with the principles of the invention.

These half planes may intersect the attractor with an edge at the unstable point at the center of each lobe, for example. The Poincare surface may be two-dimensional, but because the attractor is also nearly two-dimensional close to this surface, the intersection between the attractor and the Poincare surface may be approximately one-dimensional. For example, FIG. 3 shows a top view of the intersection of the Poincare surface with one of the lobes of the double scroll oscillator of FIG. 1. The asterisks of FIG. 3 mark the intersection of the trajectory with the Poincare half plane. In one embodiment, this set of points may be approximated by a line extending from the unstable fixed point fitted with the least squares method, for example.

In one embodiment, this line segment may then be partitioned into P equally spaced bins and the distance x from the center of each bin to the center of the corresponding lobe may be recorded. Each one of these points may then be used as a starting point and computer simulations may be run without control. The obtained trajectory may result in a symbolic sequence that is the sequence of lobes visited by the trajectory. These symbolic sequences may then be stored in a bit register. The symbolic state of the system can be represented by a function r which maps the symbolic state space coordinate x on the Poincare surface to a binary representation of the symbol sequence obtained from x.

Figure 4:
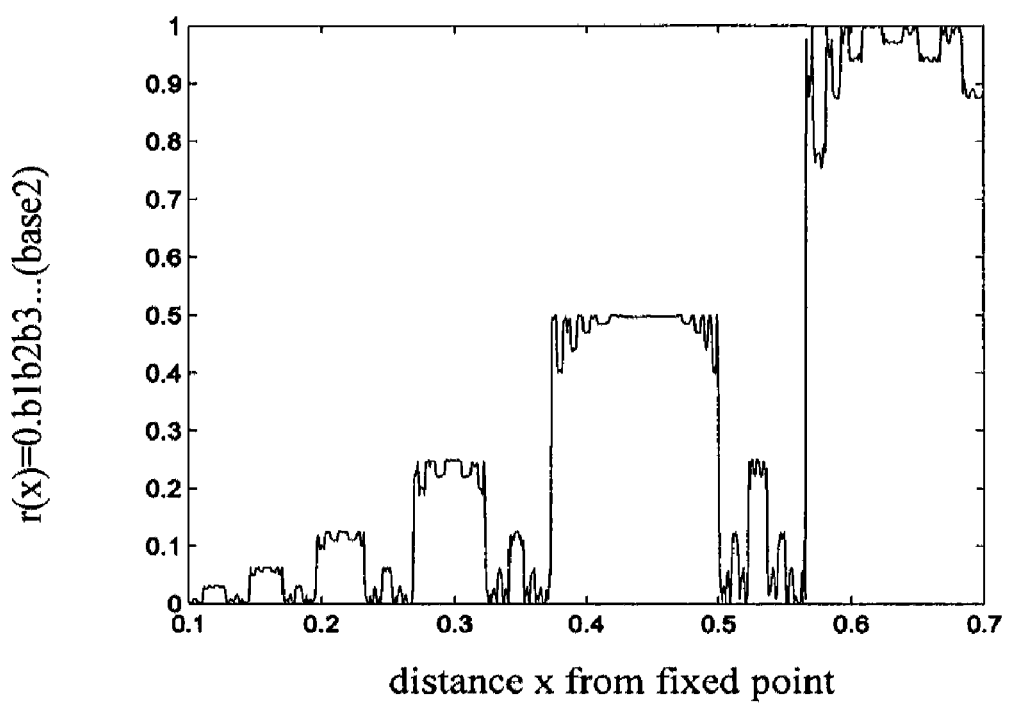
FIG. 4 is a plot of a coding function r(x) around the double scroll oscillator of FIG. 2 generated from systems and methods constructed in accordance with the principles of the invention.
Figure 5:
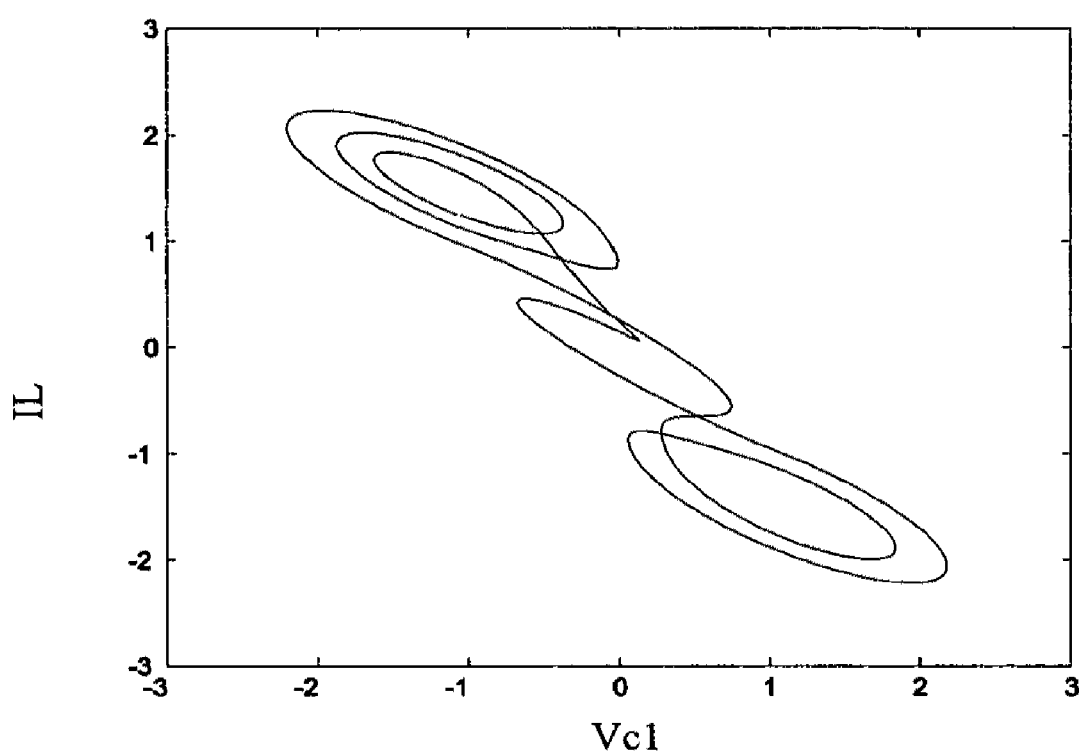
FIG. 5 is a plot of a periodic orbit of the double scroll oscillator of FIG. 2 generated from systems and methods constructed in accordance with the principles of the invention.

For example, the function r(x) may be defined that takes any point on either section and returns the future symbolic sequence for trajectories passing through that point. If $b_1$, $b_2$, $b_3$, ... represent the lobes that are visited on the attractor (so $b_1$ is either a 0 or a 1), and the future evolution of a given point $x_0$ is such that $x_0 \rightarrow b_1, b_2, b_3, \ldots, b_N$ for some number N of loops around the attractor, for example, then the function r(x) may be chosen to map $x_0$ to an associated binary fraction, so $r(x_0)=0. b_1 b_2 b_3 \ldots b_N$, where this represents a binary decimal (base 2). Then, when r(x) is calculated for every point on the cross-section, the future evolution of any point on the cross-section may be known for N iterations. The resulting function is shown in FIG. 4, where r(x) has been calculated for 12 loops around the attractor. This function r(x) may be referred to as "the coding function," and may be defined by $$r(x) = \sum_{n=1}^{\infty} \frac{b_n}{2^n}.$$

The coding function r(x) may have to be truncated to some finite value as it cannot be tracked for all future time. The truncated version of r(x) may be denoted by the following equation $r_N(x)$, where the infinite sum is truncated at n=N.

$$r_N(x) = \sum_{n=1}^{N} \frac{b_n}{2^n}.$$

In order to control the system to follow a desired symbolic sequence, the scheme may require running the simulation and waiting until the trajectory crosses a Poincare surface, for example at $x_0$. The value of $r(x_0)$ may yield the future symbolic sequence followed by the current trajectory for N loops. If a different symbol in the Nth position of the symbolic sequence is desired, $r(x)$ can be searched for the nearest point on the section that will produce the desired symbolic sequence. The trajectory can be perturbed to this new point, and it may continue to its next encounter with a surface. This procedure can be repeated as many times as is desirable.

In some embodiments, the calculation of $r(x)$ may be done discretely by dividing up each of the cross-sections into a certain amount of partitions or bins and by calculating the future evolution of the central point in the partition for up to a certain number of loops around the lobes. As an example, controls may be applied so that effects of a perturbation to a trajectory can be evident after only a certain amount of loops around the attractor (e.g., after only 5 loops). In addition to recording $r(x)$, a matrix M may be constructed that contains the coordinates for the central points in the bins, as well as instructions concerning the controls at these points. These instructions may simply describe how far to perturb the system when it is necessary to apply a control. For example, at an intersection of the trajectory with a cross-section, if $r(x_0)$ indicates that the trajectory will trace out the sequence 10001, and sequence 10000 is desired, then a search may be made for the nearest bin to $x_0$ that will give this sequence, and this information may be placed in matrix M. If the nearest bin is not unique, then there may be an agreement about which bin to take (e.g., the bin farthest from the center of the loop).

Because the new starting point after a perturbation may have a future evolution sequence that may differ from the sequence followed by $x_0$ by at most the last bit, only two options may need to be considered at each intersection: control or no control. In an analog hardware implementation, the perturbations may be applied using voltage changes or current surges. In a software implementation, the control matrix M may be stored along with the software computing the chaotic dynamics so that when a control perturbation is required, the information may be read from matrix M.

Microcontrols may also be used. For example, in a software embodiment, each time a trajectory of the chaotic system passes through a cross-section, the simulation may be backed-up one time step, and the roles of time and space may be reversed in a Runge-Kutta solver, for example, so that the trajectory can be integrated onto the cross-section without any interpolation. Then, at each intersection where no control is applied, the trajectory may be reset so that it starts at the central point of whatever bin it is in. This resetting process can be considered the imposition of microcontrols. It may remove any accumulation of round-off error and may minimize the effects of sensitive dependence on initial conditions. It also may have the effect of restricting the dynamics of the chaotic attractor to a finite subset of the full chaotic attractor, although the dynamics may still visit the full phase space. These restrictions can be relaxed by calculating $r(x)$ and matrix M to greater precision at the outset.

As also shown in process 100 of FIG. 1, the next step 104 may be the imposition of an initialization code on the chaotic system. The initialization code may drive the chaotic system onto a periodic orbit and may stabilize the otherwise unstable periodic orbit. More specifically, the chaotic system may be driven onto a periodic orbit by sending it a repeating code. Different repeating codes may lead to different periodic orbits. For a large class of repeating codes, the periodic orbit reached may be dependent only on the code segment that is repeated, and not on the initial state of the chaotic system (although the duration of time to get on the periodic orbit can vary depending on the initial state). Consequently, it is possible to send an initialization code that drives the chaotic system onto a known periodic orbit.

These special repeating codes may lead to unique periodic orbits for all initial states, so that there may be a one-to-one association between a repeating code and a periodic orbit. However, for some repeating codes, the periodic orbits themselves may change as the initial state of the chaotic system changes. Consequently, repeating codes can be divided into two classes, initializing codes and non-initializing codes. The length of each periodic orbit may be an integer multiple of the length of the repeating code, since periodicity may be attained only when both the current position on the cross-section as well as the current position in the repeating code may be the same as at some previous time. To guarantee that the chaotic system is on the desired periodic orbit, it may be sufficient that the period of the orbit be the length of the smallest repeated segment of the initializing code.

As is further shown in process 100 of FIG. 1, the next step 106 may be generating a basic waveform from the periodic orbit. In one embodiment, this may be a one-dimensional, periodic waveform, for each periodic orbit, by taking the x-, y-, or z-component (or any combination of them) of the periodic orbit over time. By sampling the amplitude of the waveform over time (e.g., using audio standard PCM 16), a digital version can be produced. These basic waveforms can be highly complex and can have strong harmonic structure. The basic waveforms can have more than 50 strong harmonics for some initialization codes, and an important factor that contributes to the performance of the signal analysis (e.g., signal compression) may be that complex basic waveforms with many strong harmonics can be produced with the same number of bits in the initialization code as simpler basic waveforms with only a few harmonics. This is indicative of the potential for compression inherent in this system since complex basic waveforms may be produced as easily as simple basic waveforms. This may only be possible because of the nonlinear chaotic nature of the dynamical system.

The chaotic system can be implemented entirely in software. The chaotic system in such an implementation may be defined by a set of differential equations governing the chaotic dynamics (e.g., the double scroll equations described above). The software may utilize an algorithm to simulate the evolution of the differential equations (e.g., the fourth order Runge-Kutta algorithm).

The chaotic system can also be implemented in hardware. The chaotic system may still be defined by a set of differential equations, but these equations may then be used to develop an electrical circuit that can generate the same chaotic dynamics. The procedure for conversion of a differential equation into an equivalent circuit is well-known and can be accomplished with analog electronics, microcontrollers, embedded central processing units ("CPUs"), digital signal processing ("DSP") chips, or field programmable gate arrays ("FPGAs"), as well as other devices known to one skilled in the art, configured with the proper feedbacks. The control information may be stored in a memory device, and controls may be applied by increasing voltage or inducing small current surges in the circuit, for example.

Therefore, the process of perturbing or not perturbing the trajectory can be described by a binary sequence, with 1 meaning apply the control and 0 meaning no control, for example. If a control is repeatedly applied to the system, after an initial transient state, the trajectory may close up on itself to form a unique periodic orbit.

When the binary sequence of controls and microcontrols are applied in this manner, there may only be a finite number of orbits on the attractor, so the periodicity of the dynamics may eventually be guaranteed even if no controls are applied. However, when the initializing controls are applied, the system may stabilize onto the periodic orbits, sometimes referred to as cupolets. For example, a compressed initializing code (e.g., 01011) may be repeated for the double-scroll oscillator of FIG. 2. The chaotic dynamics of the system may be driven onto the periodic orbit shown in FIG. 5. This periodic orbit may be stabilized by the control code, and may be a period 5 cupolet, for example.

A number of the control strings may cause the chaotic system to stabilize onto a periodic orbit, and these periodic orbits may be in one-to-one correspondence with the control string used (and may be independent of the initial state of the system). Furthermore, for a given gate size for a control scheme and for a fixed number N of control bits, a finite, but sufficiently large number of cupolets can be generated.

Once a cupolet is stabilized, for example, the cupolet may form a closed loop that tracks around the attractor and may be defined by the state variables (e.g., $V_{C1}$, $V_{C2}$, and $i_L$), for example. The conversion to a one-dimensional waveform can be done in a circuit implementation by taking the output of one of the voltage or current measurements, for example. If performed in software, a digitized waveform can be produced, for example, by sampling one of the state variables. The term cupolet can be used to, for example, represent both the periodic orbit in three dimensions and the one-dimensional waveforms that it may produce.

Alternatively or additionally to double scroll oscillator systems, other chaotic systems, such as Rossler systems, Lorenz systems, and general unimodal maps, may also be used to generate cupolets according to the invention. For example, cupolets generated using a Rossler system may have less interesting harmonics, but may be easier to process.

Cupolets may be useful in a variety of applications, and particularly in compression of speech, music, images and video, for example, as described in "Short, K. M., Garcia, R. A., Daniels, M., Curley, J., Glover, M.: 'An Introduction to the Koz Scalable Audio Compression Technology,' AES 118th Convention preprint: 6446 (May 2005)" and "Short, K. M., Garcia, R. A., Daniels, M.: 'Scalability in Koz Audio Compression Technology,' AES 119th Convention preprint: 6598 (October 2005)," each of which is hereby incorporated herein in its entirety. However, the properties of cupolets can also be utilized to approximate discrete signals. Therefore, according to the invention, a multiresolution analysis may be constructed and cupolets may be used to approximate arbitrary signals and compress images, for example.

Two of the most effective signal analysis techniques for compression are windowed Fourier and wavelet transforms. The building blocks of windowed Fourier analysis are sines and cosines or their complex equivalents. When applied to signal processing of digital data, the windowed Fourier analysis may be done with sliding data windows. On the other hand, wavelet analysis is analysis based on scale. In some ways, wavelet analysis can be an alternative to classical Fourier analysis. In wavelet analysis, the building block can be referred to as a mother wavelet and may generally be compact and oscillatory. There are three basic wavelet operators that can play the role of sliding windows in Fourier analysis. These three operators are: (1) translation by h, defined by $(\tau_h f)(x)=f(x-h)$; (2) dilation by $r>0$, defined by $(\rho_r f)(x)=f(rx)$; and (3) modulation by m, defined by $(\mu_m f)(x)=e^{imx}f(x)$. These operators may be applied to a mother wavelet to produce other wavelets.

Cupolets can be used in a similar manner to produce a multiresolution analysis according to the invention. Cupolets can be transformed between an oscillatory state similar to the sinusoidal basis of the Fourier analysis and a "compact cupolet" state that is wavelet-like. Although described in more detail below, a compact cupolet state may be referred to herein as a state where the energy of a cupolet has been concentrated around a single global maximum.

The space of real-valued N-periodic functions of a discrete variable may be denoted by $\tilde{\mathbb{R}}^N$, as shown by the following:

$$\tilde{\mathbb{R}}^N = \{f: \mathbb{N} \to \mathbb{R} | f(n+N)=f(n), n \in \mathbb{N}\},$$

where N may represent the number of discrete samples in one period of the function.

If $\gamma(t) \in (\tilde{\mathbb{R}}^3)^N$ is a periodic orbit of a chaotic system, such as a periodic orbit of the chaotic system described above with respect to FIGS. 1-5 (i.e., a cupolet of the double scroll oscillator), and assuming that $\gamma(t)=(x(t), y(t), z(t))$, the discrete Fourier transform of one of the components of $\gamma$ may be computed (e.g., discrete Fourier transform $\hat{x}$ may be computed for component x). $\alpha_k$ may represent the Fourier coefficients of the signal x, as shown by the following:

$$\alpha_k = \frac{1}{2\pi}\hat{x}\left(\frac{2\pi}{N}k\right) = \frac{1}{N}\sum_{n=0}^{N-1} x(n)\exp\left(-ik\left(\frac{2\pi}{N}\right)n\right).$$

For a real valued signal $x \in \tilde{\mathbb{R}}^N$, the Fourier coefficients $\alpha_k$, $k=0,\ldots,N-1$, are complex valued numbers, as shown by the following:

$$\alpha_k = |\alpha_k|\exp(i\phi(k)),$$

where $\phi(k)$ in the above equation is the phase term.

To convert the cupolet into a compact state according to the invention, a phase transformation can be performed on the cupolet. This may align all of the frequency components so that they can add constructively at a certain position of the window (e.g., the center of the window). In order to concentrate the energy of the cupolet at the p-th position of the window, the phase term can be changed to:

$$2\pi k \frac{p}{N}.$$

For the case where $$P = \frac{N}{2},$$

the final phase term may be of the form $\pi k$. Furthermore, $\tilde{\alpha}_k$ may be defined as:

$$\tilde{\alpha}_k = |\alpha_k|\exp(i\pi k),$$

and the signal $\tilde{x} \in \mathbb{R}^N$ may be defined by:

$$\tilde{x}(n) = \sum_{k=1}^{N} \tilde{\alpha}_k \exp\left(ik\left(\frac{2\pi}{N}\right)n\right) \text{ for } n = 0, \ldots, N-1.$$

In this way, a discrete periodic signal $\tilde{x}$ with a period N may be obtained that has most of its energy concentrated in the center of the window, for example.

Figure 6:
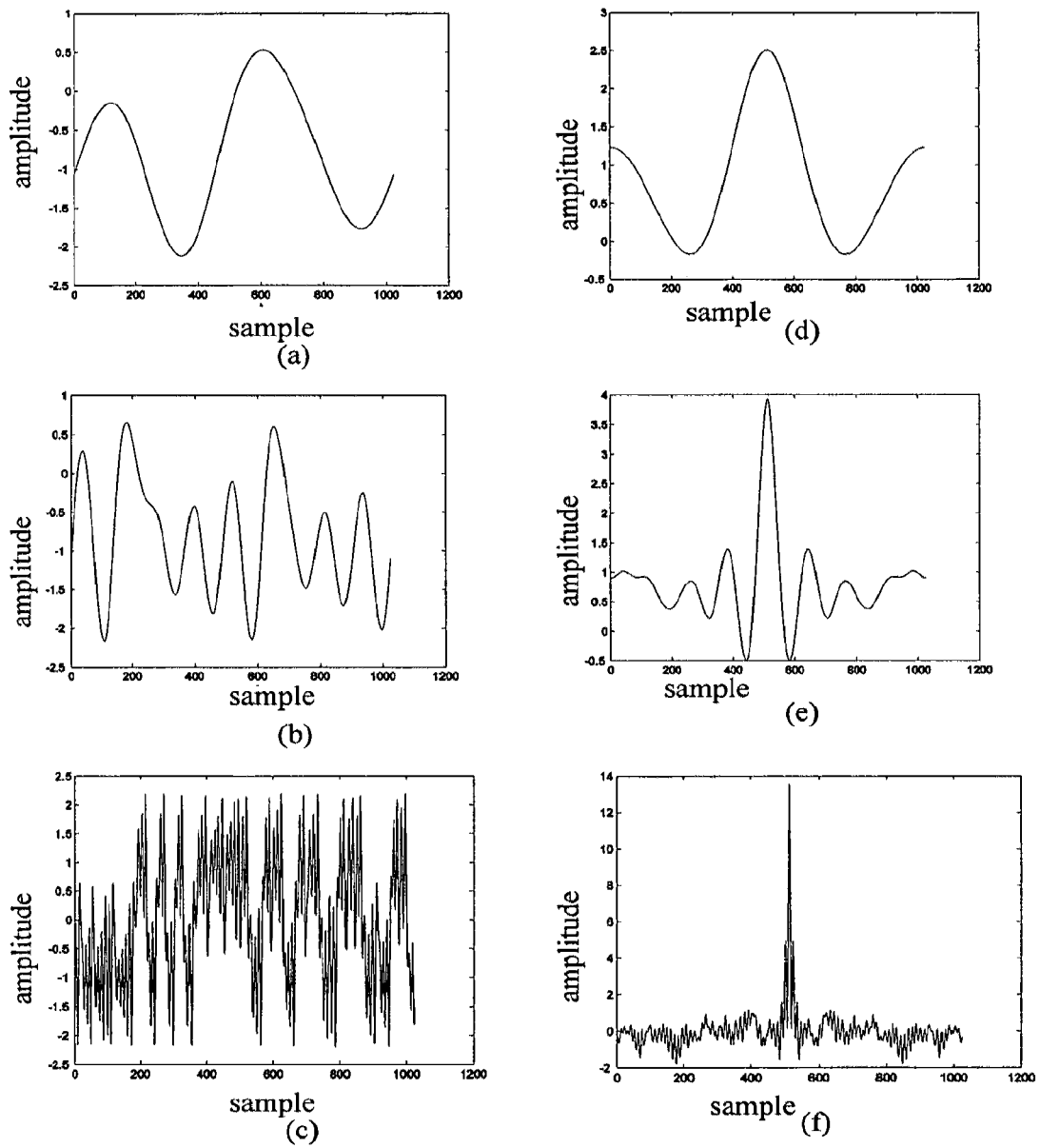
FIG. 6 shows illustrations of cupolets and corresponding compact cupolets generated from systems and methods constructed in accordance with the principles of the invention.

A few examples of a cupolet and its corresponding compact form are shown in FIG. 6, for example. The three examples of compact cupolets shown in the graphs of the second column of FIG. 6 (i.e., parts (d), (e), and (f)) may be created by performing this phase transformation of the invention on the respective cupolets shown in the graphs of the first column of FIG. 6 (i.e., parts (a), (b), and (c)).

These compact cupolets may be wavelet-like signals. Various methods of operating on a compact cupolet to produce bases for function representation are provided according to the invention. The optimum selection of the cupolet may be accomplished in many suitable ways. In one embodiment, the harmonic structure of the signal may be examined and then the cupolet that most closely matches the spectrum may be chosen as the optimum cupolet. For example, the cupolet with a power spectrum closest to the spectrum of the signal to be analyzed in a least squares sense, or any other type of minimization function, for example, may be chosen.

According to one embodiment of the invention, operating on a compact cupolet to produce bases for function representation may be accomplished by constructing a basis using a recursive process similar to the process of creating a Walsh basis. A discussion on Walsh transforms may be found, for example, in "Beer, T.: 'Walsh Transforms,' American Journal of Physics 49 (1981) 466-472," which is hereby incorporated by reference herein in its entirety. According to another embodiment of the invention, operating on a compact cupolet to produce bases for function representation may be accomplished by defining and conducting a partial periodic multi-resolution analysis and studying the properties of the basis elements at different resolution-levels. According to yet another embodiment of the invention, operating on a compact cupolet to produce bases for function representation may be accomplished by conducting a periodic multiresolution analysis that may be constructed with each resolution-level created by translations of an appropriately chosen scaling function.

In each case, arbitrary signals may be approximated at different resolution-levels and a sample image may be compressed. The image may be a standard image widely used in the image compression community, for example. Any signal that can be sampled may be approximated according to the invention, including, but not limited to, signals found in media (e.g., voice, music, images, and video), measurement outputs of a measurement in a system (e.g., voltage measurements from some point in a circuit or average monthly sunspot activity over a period of time), and combinations thereof. Whenever a basis is determined, any signal in the space characterized by the basis may be represented. Some bases may provide a rapidly converging representation, such that the representation may be truncated without losing too much valuable information. Such a truncated representation may provide a compressed representation.

Although each of these approaches may produce acceptable results, even better quality may be achieved by manipulating the phase of the cupolet. A complexification process is provided according to the invention that can create a degree of phase flexibility and can help to avoid the artifacts that may appear in the image due to compression and the inherent grid alignment that may occur in other approaches. This process of complexification may force the cupolet to move into a potentially non-compact state and may adjust the cupolet to match the signal in the best possible way with one (complex) degree of freedom.

It is to be noted that the basis generation techniques of the invention may be known by both the transmitter and the receiver of the compressed image, through storage in ROM or by regeneration in software, for example. Compression may occur at a functional level when an N-point sampled signal can be regenerated to a desired quality level with fewer than N basis elements. It is also to be noted that compression, as referred to herein, may generally be understood to be function-level compression. Function-level compression is still one step removed from the bit-level compression that should be examined to determine the general and most efficient compression method. In practical applications, bit-level compression may factor in the number of bits used to represent a basis element. The various techniques provided by the invention for operating on a compact cupolet to produce bases for function representation are presented without choosing the most efficient compression method, as a method that may appear less efficient at a functional level, may allow a greater bit-wise compression due to several factors, such as patterns in the coefficients, for example.

According to one embodiment of the invention, operating on a compact cupolet to produce bases for function representation may be accomplished by constructing a basis using a recursive process similar to the process of creating a Walsh basis. Therefore, a method of creating a Walsh basis can be used with compact cupolets to approximate elements of the space of discrete functions over $N=2^n$ samples, $\mathbb{R}^N$. For example, operating on a compact cupolet of size N, producing bases for function representation may be accomplished as follows.

First, the cupolet may be extended non-periodically over the entire real line by defining the cupolet to be zero outside the window. Next, transforms, such as Walsh transforms, for example, may be applied to this extension of the cupolet to obtain a chain of linear spaces. Each of the linear spaces can be regarded as a resolution-level, and each resolution-level may be used to approximate signals. Finally, in order to get better approximations, the cupolets may be sent through a nonlinear phase deformation, which may adjust the cupolets in a least squares sense, for example, to approximate the signal. This process may be referred to as a complexification process.

In one example, let $\psi$ be a given compact cupolet defined over a sample window, assume $N=2^n$ samples are taken in the window, and also let $\psi_0$ be defined as zero outside the window. A sequence of functions $\psi_j$, $j=0, 1, \ldots, n-1$, may be defined as follows:

$$\psi_{2j+2}(x) = \psi_j(2x) + (-1)^j \psi_j\left[2\left(x - \frac{N}{2}\right)\right]$$

$$\psi_{2j+1}(x) = \psi_j(2x) - (-1)^j \psi_j\left[2\left(x - \frac{N}{2}\right)\right].$$

Using this defined sequence of functions, x may be taken to range over the N samples in the sample window, with the extension of the function being zero outside the window.

Figure 7:
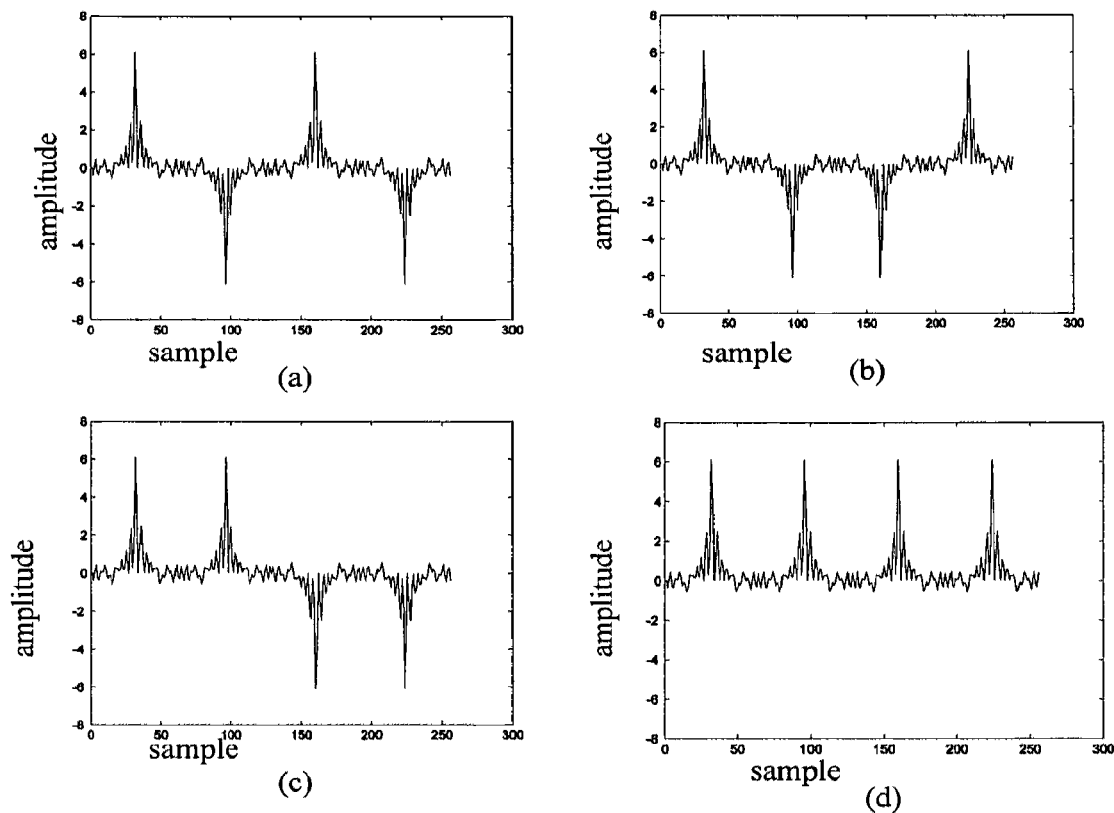
FIG. 7 shows illustrations of basis elements of a space generated from systems and methods constructed in accordance with the principles of the invention.

In one example, $[|\Psi_0|\Psi_1|\Psi_2| \ldots |\Psi_j]$, where $\Psi_j$, $j=1, \ldots, n-1$, may be a matrix whose columns may be $\psi_2^{j-1}, \ldots, \psi_2^{j}$ (i.e., $\Psi_j = [\psi_2^{j-1} \ldots \psi_2^{j}]$). One can easily verify that the columns of $\Psi_j$ may construct an orthogonal set. By letting $V^j$ be the closure of the linear span of the columns of the matrix $[\Psi_0|\Psi_1|\Psi_2| \ldots |\Psi_j]$, in one embodiment, a sequence of linear spaces $V^0 \subset V^1 \subset \ldots \subset V^{n-1} = \bar{\mathbb{R}}^{2n}$ may be obtained. The basis elements for the space $\Psi^2$, for example, are shown in FIG. 7. A direct application of this basis can produce a fair representation of an image. However, there may be strong and persistent artifacts where the basis functions overlap. Therefore, a direct use of this adapted Walsh transform may not be optimal. Instead, this technique may be extended.

For example, given an integer $0 \leq j \leq n-2$, the basis elements in the space $V^j$ may be complexified as follows. First, let $\psi_j$ be a matrix whose columns are the Fourier coefficients of the corresponding column in $\psi_j$. That is, let $$\hat{\Psi}_j = [\hat{\psi}_{2^{j-1}} \ldots \hat{\psi}_{2^{j}-1}],$$

where $\hat{\psi}_k$, $k = 2^{j+1}, \ldots, 2^j - 1$ are column vectors that may contain the Fourier coefficients of $\psi_k$. Then, $\hat{\Psi}_j$ may be written as $$\hat{\Psi}_j = \hat{\Psi}_j^+ + \hat{\Psi}_j^-,$$

where $\hat{\Psi}_j^+$ and $\hat{\Psi}_j^-$ may be two matrices whose columns consist of positive frequencies and negative frequencies of columns of $\hat{\Psi}_j$. For example, if $\hat{\Psi}_j$ is represented by the matrix $$\hat{\Psi}_j = \begin{bmatrix} a_{00} & a_{10} & \ldots & a_{(2^{j-1})0} \\ a_{01} & a_{11} & \ldots & a_{(2^{j-1})1} \\ \vdots & \vdots & & \vdots \\ \bar{a}_{02} & \bar{a}_{12} & \ldots & \bar{a}_{(2^{j-1})2} \\ \bar{a}_{01} & \bar{a}_{11} & \ldots & \bar{a}_{(2^{j-1})1} \end{bmatrix},$$

then $\hat{\Psi}_j^+$ and $\hat{\Psi}_j^-$ may be represented by the matrices $$\hat{\Psi}_j^+ = \begin{bmatrix} a_{00} & a_{10} & \ldots & a_{(2^{j-1})0} \\ a_{01} & a_{11} & \ldots & a_{(2^{j-1})1} \\ \vdots & \vdots & & \vdots \\ 0 & 0 & \ldots & 0 \\ 0 & 0 & \ldots & 0 \end{bmatrix} \text{ and }$$

$$\hat{\Psi}_j^- = \begin{bmatrix} 0 & 0 & \ldots & 0 \\ 0 & 0 & \ldots & 0 \\ \vdots & \vdots & & \vdots \\ \bar{a}_{02} & \bar{a}_{12} & \ldots & \bar{a}_{(2^{j-1})2} \\ \bar{a}_{01} & \bar{a}_{11} & \ldots & \bar{a}_{(2^{j-1})1} \end{bmatrix}.$$

Next, the inverse Fourier transform of the columns of the matrices $\hat{\Psi}_j^+$ and $\hat{\Psi}_j^-$ may be taken to obtain two new matrices $\Psi_j^+$ and $\Psi_j^-$ with complex elements. It is to be noted that $$\Psi_j = \Psi_j^+ + \Psi_j^-.$$

Then, a $(2^n \times 2^{j+1})$-complex matrix $\Phi_j$ may be created by filling the first half of the columns with the columns of $\Psi_j^+$ and the second half of the columns with the columns of $\Psi_j^-$, but by also reversing the order of the columns. For example, then $\Phi_j$ may be represented by the matrix $$\Phi_j = \begin{bmatrix} \Psi_j^+(0,0) & \ldots & \Psi_j^+(0, 2^j-1) & \Psi_j^-(0, 2^j-1) & \ldots & \Psi_j^-(0,0) \\ \Psi_j^+(1,0) & \ldots & \Psi_j^+(1, 2^j-1) & \Psi_j^-(1, 2^j-1) & \ldots & \Psi_j^-(1,0) \\ \vdots & & \vdots & \vdots & & \vdots \\ \Psi_j^+(2^n-2, 0) & \ldots & \Psi_j^+(2^n-2, 2^j-1) & \Psi_j^-(2^n-2, 2^j-1) & \ldots & \Psi_j^-(2^n-2, 0) \\ \Psi_j^+(2^n-1, 0) & \ldots & \Psi_j^+(2^n-1, 2^j-1) & \Psi_j^-(2^n-1, 2^j-1) & \ldots & \Psi_j^-(2^n-1, 0) \end{bmatrix},$$

where $\Psi_j^\pm(l, k)$ may be the $(l,k)$-th element of the matrices $\Psi_j^\pm$.

Given a function $f \in \bar{\mathbb{R}}^{2n}$ representing $N = 2^n$ samples of a signal, the best approximation to $f$, in the least squares sense, for example, may then be obtained using the columns of the matrix $\Phi_j$. One way this can be achieved is by performing a singular value decomposition ("SVD") of the matrix $\Phi_j$ and solving the system of the linear equations $$\Phi_j \vec{c} = f,$$

where $c$ may be the vector of coefficients and $f$ may be viewed as a column vector.

Figure 8:
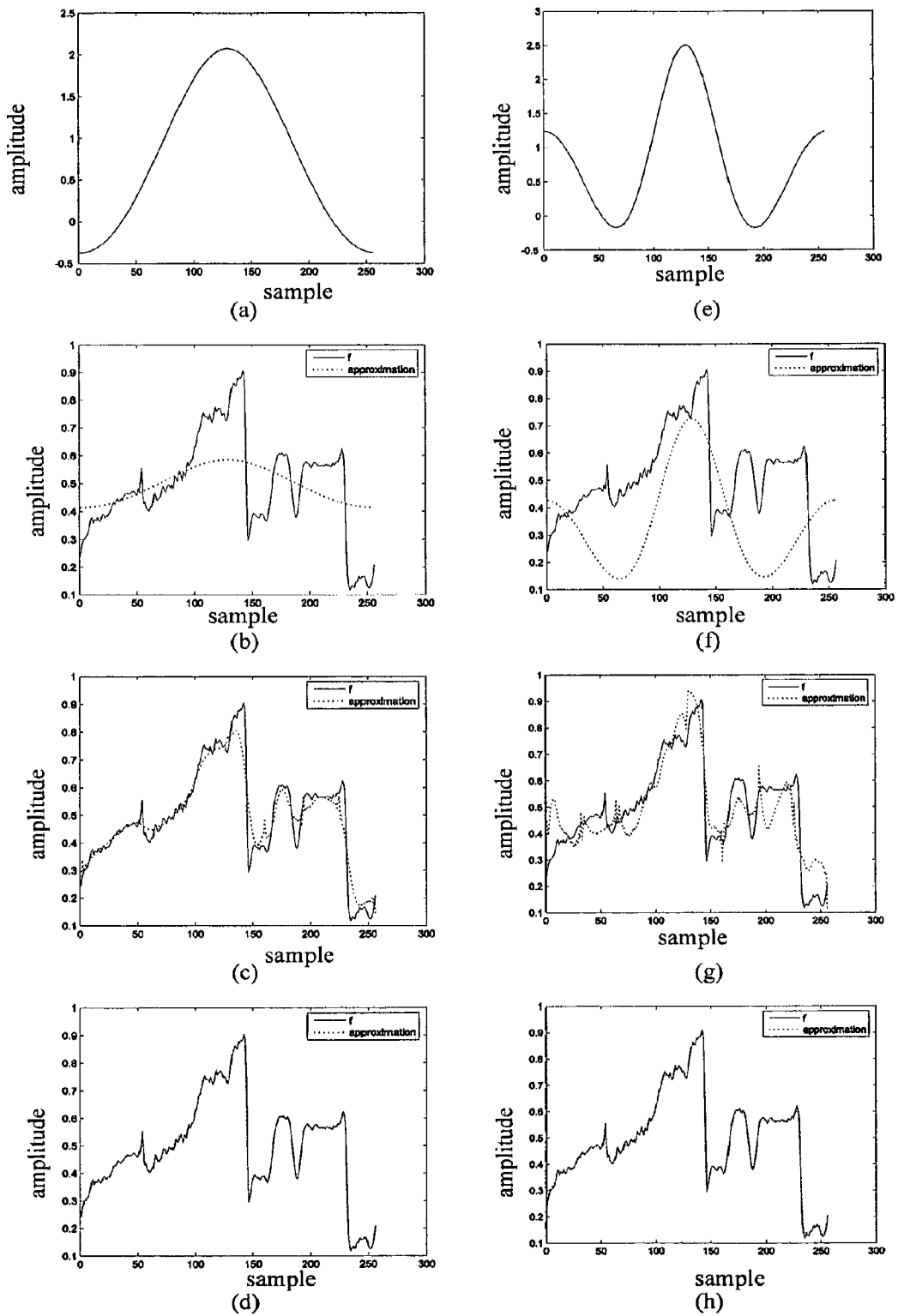
FIG. 8 shows illustrations of cupolets approximating arbitrary signals using various resolution-levels generated from systems and methods constructed in accordance with the principles of the invention.

As shown in FIG. 8, for example, two different compact cupolets (i.e., as shown in parts (a) and (e)) may be used to approximate an arbitrary signal $f$ at different resolution-levels using a Walsh Transform-like technique according to the invention. For example, parts (b) and (f) of FIG. 8, using the cupolets of parts (a) and (e), respectively, may correspond to the coarsest level (i.e., level 0) of approximation using only one basis element. Parts (c) and (g), on the other hand, may correspond to level 4 of approximation using 16 basis elements, for example. It may be seen that the fit in part (c) is converging more rapidly than the fit in part (b), for example, and that the overall structure of the signal $f$ is fit reasonably in the coarsest level, but that the finer structures of the signal are not fit until the higher levels of approximation. For example, parts (d) and (h) may correspond to level 8 of approximation using 256 basis elements. In one embodiment, there may be 256 sample points in the signal $f$. Therefore, at the highest resolution level (i.e., when the number of basis elements is equal to the dimension of the space), the fit may be exact (i.e., up to machine precision).

When approximating a given signal $f$ with a given compact cupolet $c$, the complexification process may introduce a complex number $\alpha$, such that $$f \approx \alpha c^+ + \bar{\alpha} c^-,$$

where $\bar{\alpha}$ may denote the complex conjugate of $\alpha$. The term $\alpha c^+ + \bar{\alpha} c^-$ can be regarded as a nonlinear phase deformation of the compact cupolet $c$ that can result in the best approximation of the signal $f$ with one complex parameter $\alpha$.

The Walsh Transform-like technique can also be used in image compression in accordance with the invention. For example, given an image, the image may first be transformed into a color space, such as YCbCr or YUV. For the ease of computations, it may be assumed that the image has side lengths equal to powers of 2 in this example. Then, any suitable scanning method may be used to scan each layer of the image, including, but not limited to, horizontal scan, vertical scan, zig-zag scan (i.e., on line one go left to right and then on line two go right to left and continue altering this pattern), any of the known scanning methods that may be applied to any of the sub-blocks of the image, and combinations thereof, for example. In this embodiment, 3 one-dimensional signals representing each layer of the image may be obtained, for example. Using similar techniques, as in windowed Fourier analysis, these signals may be partitioned into desirable windows and each window may be represented using the compact cupolet transform described above.

Figure 9:
FIG. 9 shows illustrations of an image compressed using various resolution-levels generated from systems and methods constructed in accordance with the principles of the invention.

FIG. 9, for example, shows compressions of a sample image (i.e., parts (b), (c), and (d)) along with the original image (i.e., part (a)). The size of the original image used is 256×256 pixels and the size of the windowed data is a single scan line or 256 points. The compressions of parts (b), (c), and (d) of FIG. 9 are done in resolution-levels 4, 6, and 8, respectively, and the number of basis elements per data window in each of these three compressions is 15, 63, and 254, respectively. In this example, the cupolet used to compress the image of part (a) of FIG. 9 is the same as the cupolet in part (e) of FIG. 8. The spikes in the reconstructed signal in part (g) of FIG. 8 clearly explain the vertical line artifacts that appear in part (b) of FIG. 9.

There are several other possible ways of implementing this method for image compression according to the invention, such as by using different scanning techniques or by creating two-dimensional bases. For example, a two-dimensional basis could be created by taking the "product" of a cupolet in the horizontal direction, with a cupolet in the vertical direction, such that the two-dimensional cupolets would represent a surface over the image plane. For example, if C1 is one cupolet and C2 is another cupolet, then a two-dimensional version could be defined as D(x,y)=C1(x)·C2(y), such that for any pixel with indices (x,y), the value of D(x,y) could be the value (e.g., height) of the two-dimensional cupolet at the point (x,y).

According to another embodiment of the invention, operating on a compact cupolet to produce bases for function representation may be accomplished by defining a partial periodic multiresolution analysis ("PPMRA") and constructing a PPMRA using compact cupolets. For example, given a compact cupolet over a window of length N, this PPMRA technique may be accomplished as follows.

First, the cupolet may be down-sampled to some number of points N/P, where P may be a factor of N. The number P may be small enough so that the cupolet does not lose its topological structure. This can provide a shorter vector that has the same shape as the original compact cupolet. Next, the cupolet may be padded with zeros such that it may have the same length as the data window. This can simplify processing by allowing all vectors to have the same length. Then, the zero-padded cupolet may be periodically extended to the entire real line. This zero-padded cupolet may act as a scaling function that can be utilized to construct a multiresolution analysis. For example, the zero-padded cupolet may act as a scaling function that can be utilized in the same way that scaling functions are used to construct wavelet bases. A multiresolution analysis may then be used to approximate signals at different resolutions. This process is now described in more detail.

In one embodiment of the invention, the construction of a PPMRA may be guided in part by "Petukhov, A.: 'Periodic Discrete Wavelets,' Algebra i Analiz 8 (1996) 151-183," which is hereby incorporated by reference herein in its entirety. For example, the basis functions may be sampled $N=2^n$ times in a data window, but they may be extended periodically outside of the window. Therefore, in one embodiment, whenever an index ranges beyond N, the value may be taken from the periodic extension.

In accordance with an embodiment of the invention, a PPMRA may be defined as follows. A sequence of linear function spaces $\{V^j\}_{j=s}^n$, $s \geq 0$, may be referred to as a partial periodic multiresolution analysis ("PPMRA") of the space $\tilde{\mathbb{R}}^N$, $N=2^n$, if the following conditions or properties are satisfied:

(1) $V^s \subset V^{s+1} \subset \ldots \subset V^j \subset \ldots V^n = \tilde{\mathbb{R}}^N$; dim $V^j = 2^j$, j=s, ..., n;

(2) If $f(x) \in V^j$, then $f(2x) \in V^{j+1}$;

(3) If $f(x) \in V^{j+1}$, then there exists $g(x) \in V^j$ such that $$g(2x) = f(x) + f\left(x + \frac{N}{2}\right);$$

and (4) The spaces $V^j$, j=s, ..., n, are invariant under the shift by $2^{n-j}$ samples (i.e., for any function $f \in V^j$ and for any $k \in \mathbb{Z}$, then $f(x+k2^{n-j}) \in V^j$.

It should be noted that the index s may be bigger than 0 (i.e., the first resolution-level may include more than 1 basis element). This is because the shifts at levels lower than s may result in a degenerate cupolet representation. It should also be noted that property (3) above may define the relationship between a finer and coarser resolution. Therefore, this process can be thought of as an up-sampling of the finer resolution, and then truncation to N samples. For a given cupolet, and for a fixed sample window length, a set of sampled versions may exist that preserve the cupolet structure. This can define the total number of available resolutions. For example, for $N=2^n$ and a cupolet that must have $2^k$ samples to preserve its structure, the number P of non-degenerate resolutions may be given by the following formula:

$$P = 1 + \log_2\left(\frac{2^n}{2^k}\right) = 1 + n - k.$$

For a function $\phi^l \in V^l$, l=s, ..., $\phi^l$ may be denoted by the vector function $$\vec{\phi}^l(x) = (\phi^l(x), \phi^l(x-2^{n-l}), \ldots, \phi^l(x-(2^l-1)2^{n-l}))^T.$$

In order to construct the basis for each resolution-level with a given compact cupolet γ, the compact cupolet may first be rescaled and re-sampled. This may be done as follows according to one embodiment of the invention. For the given compact cupolet γ, assuming that it is sampled $N=2^n$ times over the data window, let $\phi^s = \gamma$. The scaling function $\phi^s$ and its shift may define the coarsest resolution-level. The next finer resolution level may be defined by regenerating (i.e., re-sampling) γ such that it has N/2 samples. Then, $\phi^{s+1}(m)$ may be defined as follows:

$$\varphi^{s+1}(m) = \begin{cases} \gamma(m) & \text{for } 0 \le m \le \frac{N}{2} - 1. \\ 0 & \text{for } \frac{N}{2} \le k < N. \end{cases}$$

This process may continue up to the finest available resolution. At this level, an integer $\bar{n} < n$ may be chosen, and the compact cupolet $\gamma$ may be regenerated with $2^{\bar{n}}$ points. Furthermore, the function $\varphi^{s+P}(m) = \varphi''(m)$ may be defined by the following:

$$\varphi^{s+P}(m) = \varphi''(m) = \begin{cases} \gamma(m) & \text{for } 0 \le m \le 2^{\bar{n}} - 1, \\ 0 & \text{for } 2^{\bar{n}} \le m < 2^n. \end{cases}$$

Figure 10:
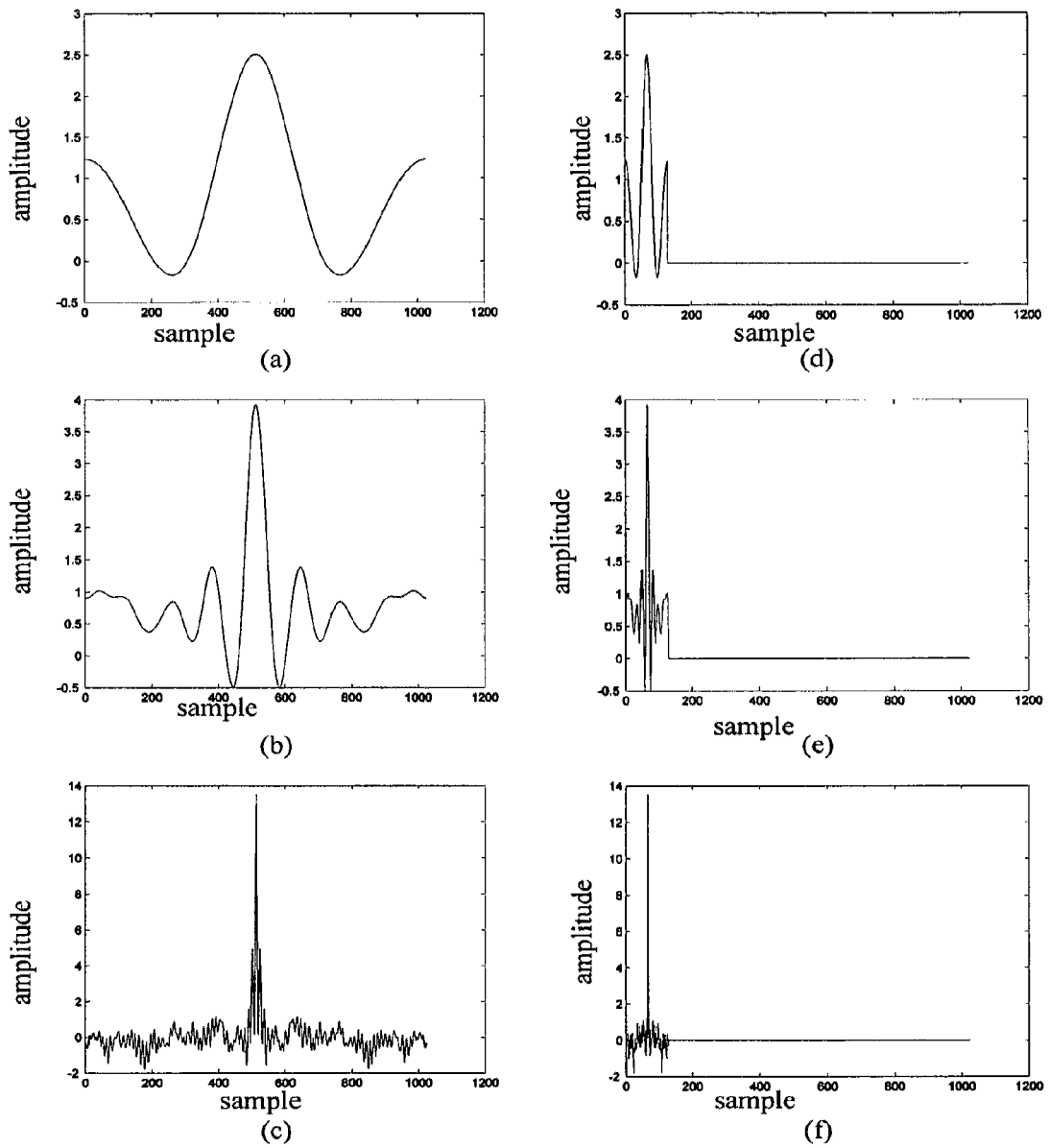
FIG. 10 shows illustrations of compact cupolets at various resolution-levels generated from systems and methods constructed in accordance with an embodiment of the invention.

The functions $\phi^i(m)$, $i=s, s+1, \ldots, s+P$ may be normalized by dividing them with their Euclidean norm. FIG. 10, for example, shows a few of the functions $\phi''$ and $\gamma$ for the case $n=10$ and $\bar{n}=7$. As shown, the functions in parts (a), (b), and (c) of FIG. 10 represent examples of compact cupolets at the coarsest resolution, while the versions in parts (d), (e), and (f) of FIG. 10 correspond to the level 4 scaling functions of parts (a), (b), and (c), respectively. It should be noted that the finest resolution-level may have $2^n$ basis elements.

In one embodiment of the invention, the scaling functions may satisfy the following recursion relation:

$$\phi^{j-1}(2m) = \phi^j(m) + \phi^j(m + 2^{n-1}), j = s+1, \ldots, n.$$

At each resolution-level j, a linearly independent set may be constructed by shifting the corresponding scaling function by $2^{n-j}$ units. For example, by letting span ($\phi^j$) denote the subspace $V^j$ spanned by the components of $\phi^j$, this space can be used to approximate all the functions $f \in \bar{\mathbb{R}}^N$ in a least squares sense. In other embodiments, rather than in a least squares sense, a measure based on a psychoacoustic measure may be used for audio and a measure based on psychovisual measure may be good for video and images.

In one embodiment, let $M^j$ be a matrix whose columns are shifted versions of the scaling function $\phi^i$. For the j-th resolution-level, the scaling function $\phi^i$ may be shifted by $m2^{n-j}$, for $m=0, 1, \ldots, 2^j-1$. For example, let matrix $M^j$ be defined as follows:

$$M^j = [\phi^j(\cdot), \phi^j(\cdot + 2^{n-j}), \ldots, \phi^j(\cdot + (2^j-1)2^{n-j})],$$

where $$\phi^j(\cdot + m2^{n-j}) = (\phi^j(1+m2^{n-j}), \phi^j(2+m2^{n-j}), \ldots, \phi^j(2^n + m2^{n-j}))^T.$$

Then, to get an approximation of function f in the space $V^j$, the following set of linear equations may be solved, for example, in the least squares sense:

$$M^j X = f,$$

where $X = (x_1, \ldots, x_{2^j})$ are the coefficients. Therefore, f(x) may be approximated as follows:

$$f(x) \approx \sum_{m=1}^{2^j} x_m \varphi^j(x + m2^{n-j}).$$

However, in practice, the matrix $M^j$ may not be of full rank when doing these computations. Therefore, to overcome this problem, a singular value decomposition of the matrix $M^j$ may be performed according to the invention. For example, it may be assumed that matrix $M^j = UWV^T$, where U and V are orthogonal matrices. The degree of singularity of the matrix $M^j$ can be determined by monitoring the diagonal elements of the matrix W that are close to zero (e.g., up to machine precision). A sufficiently small positive number $\epsilon$ may be chosen and used to replace the zero diagonal elements. This can provide a new matrix W, which in turn may give rise to a nonsingular matrix $\overline{M}^j$. The new columns of the matrix $\overline{M}^j$ may only be slightly perturbed from those in matrix $M^j$.

Figure 11:
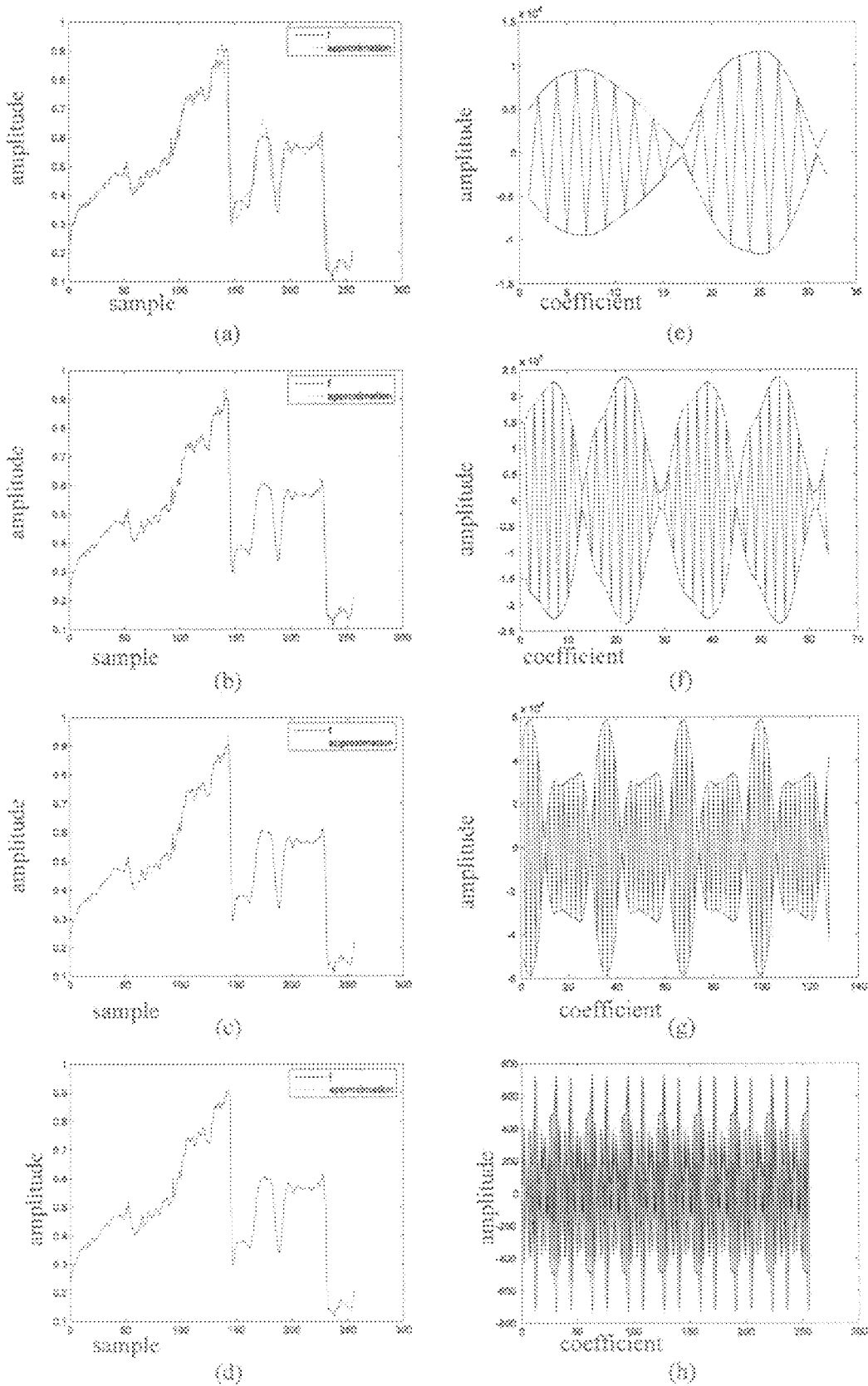
FIG. 11 shows illustrations of approximations of arbitrary signals using various resolution-levels and corresponding spectral values generated from systems and methods constructed in accordance with the principles of the invention.

Therefore, according to one embodiment of the invention, the new matrix $\overline{M}^j$ may be used to solve the linear equation $\overline{M}^j X = f$, where the solution for X can be interpreted as the spectrum of the compact cupolet transformation of the signal f. This spectrum of the signal f has very desirable structure for compression purposes. FIG. 11, for example, shows an arbitrary signal f and its approximations at different resolution-levels. In this embodiment, the actual length of the signal used is 256 samples and there are 4 different resolution-levels available, each one shown in a respective part of the first column of FIG. 11 (i.e., parts (a), (b), (c), and (d)). The number of basis elements in each of these resolution-levels is 32, 64, 128, and 256, respectively. The spectral values of a typical signal f may be oscillatory and bounded by an envelope function. This envelope function may be almost periodic and may only have low frequency components. For example, each one of parts (e), (f), (g), and (h) in the second column of FIG. 11 shows the corresponding spectral values along with the enclosing envelope function for a respective one of the signal approximations in the first column of FIG. 11 (i.e., parts (a), (b), (c), and (d)).

In accordance with an embodiment of the invention, the different resolution-levels may be combined to incorporate the coarser elements with the finer grained elements and achieve a more robust variation in approximating a signal. For example, assuming that there are a total number of $2^k$ basis elements, of length $2^n$, available in the coarsest resolution-level, then there may be a total number of $n-k+1$ available resolution-levels. A new basis matrix may be constructed by picking certain basis elements from each of these resolution-levels. In this way, a matrix may be obtained that can fit the coarser structure as well as the finer structures in a given signal.

To accomplish this, according to an embodiment of the invention, a subset of the columns from the $M^j$ matrices may be selected at each resolution-level. Since $M^j$ has $2^k$ columns, $2^l$ columns may be chosen, where $l < k$, and a matrix $W^1$ may be defined as follows:

$$W^1 = [\varphi^k(\cdot + 0 \times 2^{k-l}2^{n-k}), \varphi^k(\cdot + 1 \times 2^{k-l}2^{n-k}), \ldots ,$$
$$\varphi^k(\cdot + (2^l - 1) \times 2^{k-l}2^{n-k})]$$
$$= [\varphi^k(\cdot + 0 \times 2^{n-l}), \varphi^k(\cdot + 1 \times 2^{n-l}), \ldots ,$$
$$\varphi^k(\cdot + (2^l - 1) \times 2^{n-l})].$$

Then, a sequence of matrices $\{W^j\}_{j=2}^{n-k+1}$ may be defined by picking $2^{j+l-1}$ columns from the $(k+j-1)$-th basis matrix $M^{k+j-1}$. For example, matrix $W^j$ may be defined as follows:

$$W^j = [\varphi^{k+j-1}(\cdot + 0 \times 2^{k-l}2^{n-(k+j-1)}), \ldots ,$$
$$\varphi^{k+j-1}(\cdot + 1 \times 2^{k-l}2^{n-(k+j-1)}), \ldots ,$$

-continued $$\varphi^{k+j-1}(\cdot +(2^{j+l-1}-1)\times 2^{k-l}2^{n-(k+j-1)})]$$

$$= [\varphi^{k+j-1}(\cdot +0\times 2^{n-j-l+1}), \ldots,$$

$$\varphi^{k+j-1}(\cdot +1\times 2^{n-j-l+1}), \ldots,$$

$$\varphi^{k+j-1}(\cdot +(2^{j+l-1}-1)\times 2^{n-j-l+1})]$$

for j=2, ..., n−k+1.

Next, these newly obtained matrices may be complexified using the same technique described above or in any other suitable way, for example. The term "complexify" may be referred to herein as any technique that may give the system one complex (i.e., as in complex numbers using the square root of −1) degree of freedom, which may be the equivalent to two real degrees of freedom). This complexification can allow for some phase adjustment of the different frequencies in the cupolet so that it may need not remain in its most-compact form. Although it is to be noted that there are other suitable ways to allow the phase to vary in accordance with the invention.

Then, a column of ones may be inserted at the beginning of the matrix. By performing a least squares approximation with this matrix, the compact cupolets can go through a nonlinear phase deformation that may adjust the compact cupolets to approximate the signal in the best possible way for this one-parameter phase deformation. It is to be understood, however, that while a least squares approximation may be used in certain embodiments, there are many other suitable types of minimization functions that may be used in accordance with the invention. In order to get higher resolution-levels, this same process can be applied by picking more basis elements from each resolution-level (i.e., by choosing a smaller step size).

Figure 12:
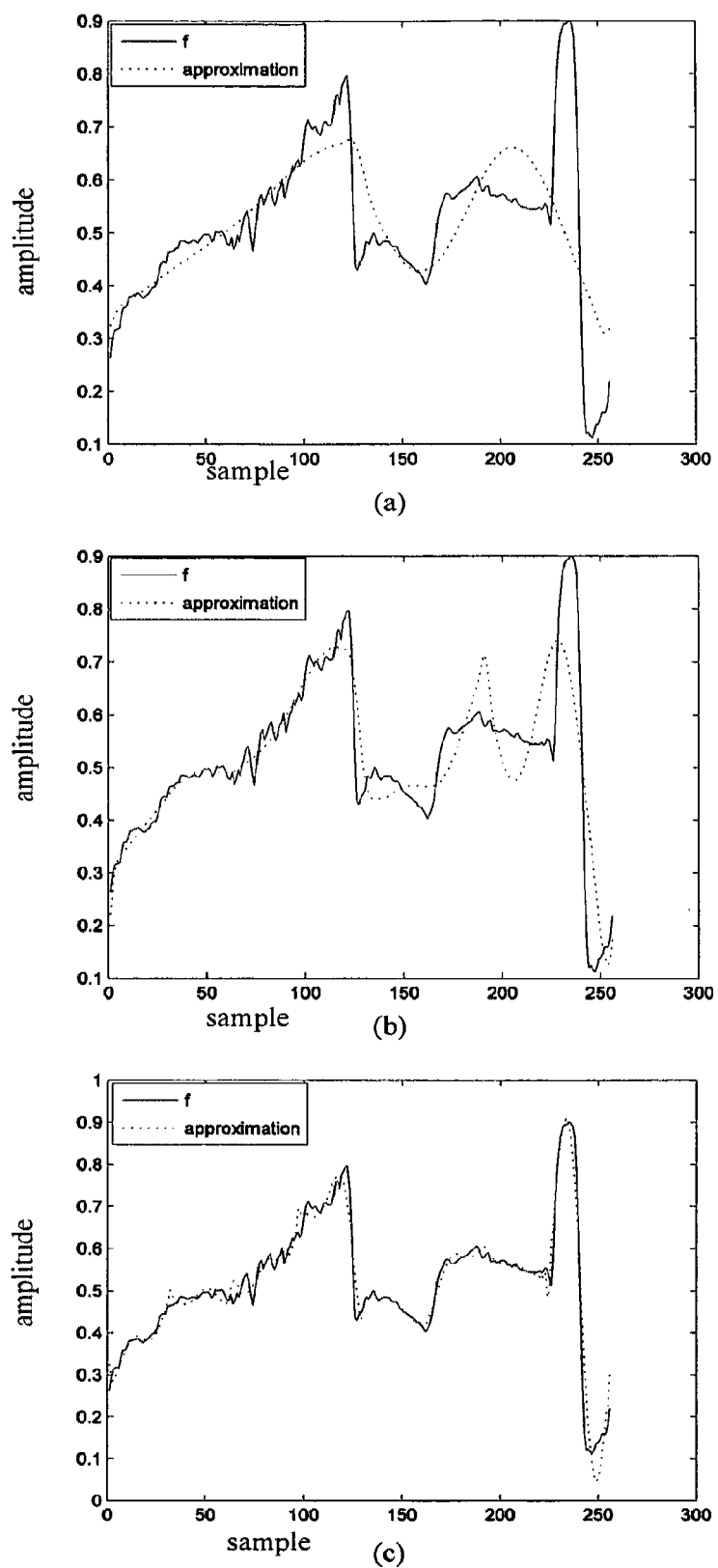
FIG. 12 shows illustrations of approximations of an arbitrary signal using various numbers of basis elements generated from systems and methods constructed in accordance with the principles of the invention.

FIG. 12, for example, shows the approximation of an arbitrary signal using a PPMRA technique according to the invention. The total number of basis elements used in the approximations of parts (a), (b), and (c) of FIG. 12 are 4, 8, and 16, respectively, and the number of samples in the signal is 256. As shown, the convergence can be extremely rapid for such a small number of basis elements.

Figure 13:
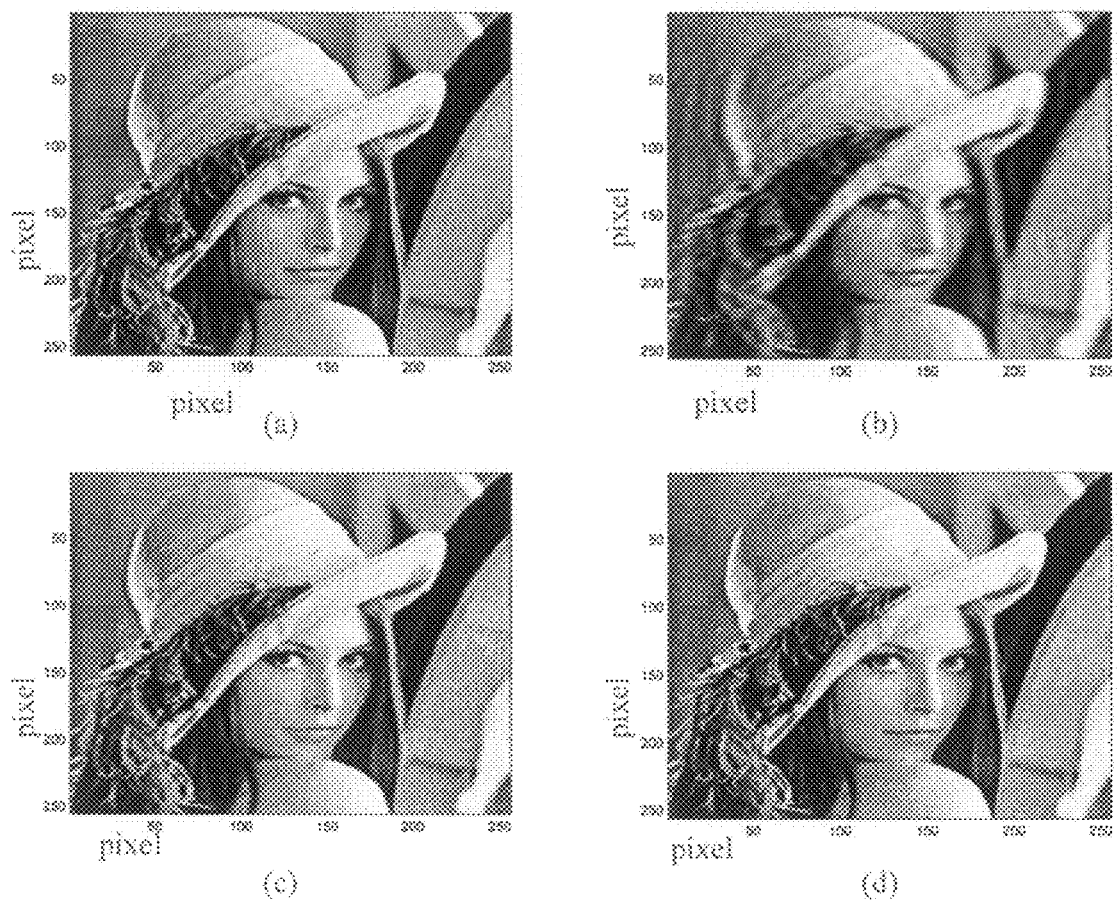
FIG. 13 shows illustrations of an image approximated using various numbers of basis elements generated from systems and methods constructed in accordance with the principles of the invention.

Similarly, this PPMRA technique can be used for compressing an image. FIG. 13, for example, shows the successive approximations of a sample image (i.e., parts (b), (c), and (d)) along with the original image (i.e., part (a)). The size of the original image used is 256×256 pixels and the size of the windowed data is a single scan line or 256 points. The compressions of parts (b), (c), and (d) of FIG. 13 are done in resolution-levels 4, 6, and 8, respectively, and the number of basis elements used in each level is 24, 56, and 120 per data window, respectively.

When compared to previous images (e.g., the images of FIG. 9), the quality of the approximated image using 24 basis elements according to this embodiment (e.g., part (b) of FIG. 13) may be considered roughly equivalent to the quality of the previous image example using 63 basis elements according to the previous embodiment (e.g., part (c) of FIG. 9). Furthermore, the quality of the approximated image using 56 basis elements according to this embodiment (e.g., part (c) of FIG. 13) may be considered essentially perfect. Therefore, by adding an extra degree of freedom associated with the phase deformation, the image reconstruction may become of significantly higher quality using fewer basis elements. This effect may be particularly noticeable on full-sized images, for example.

According to yet another embodiment of the invention, operating on a compact cupolet to produce bases for function representation may be accomplished by conducting a periodic multiresolution analysis that may be constructed with each resolution-level created by translations of an appropriately chosen scaling function. For example, given a compact cupolet, the cupolet may be down-sampled, as described above with respect to another embodiment, for example. Then the down-sampled cupolet may be padded with zeros such that it may fit the data window. By shifting this compact cupolet by certain amounts through the data window and by using the shifted cupolet as basis elements, a chain of linear subspaces may be realized that can be used to approximate signals at different resolutions. For example, given a compact cupolet over a window of length N, this scaling and shifting technique may be accomplished as follows.

First, the cupolet may be down-sampled to some number of points N/P, where P may be a factor of N. The number P may be small enough so that the cupolet does not lose its topological structure. This can provide a shorter vector that has the same shape as the original compact cupolet. It is to be understood, that while P may be a factor of any number N, P may be a power of 2 in certain embodiments such that the scaling and shifting may work out evenly. For example, if the cupolet is scaled down by a factor of 2, and then the new version is shifted by half the window, the window may still be covered. However, other divisions may be used as well, such as by letting P=3 and then using shifts of ⅓, for example, according to other embodiments of the invention.

Next, the cupolet may be padded with zeros such that it may fit in the data window. This can simplify processing by allowing all vectors to have the same length. Then, each zero-padded cupolet may be shifted by the same factor (e.g., P) to generate a linear space. Each linear space may then be used as a resolution-level. Finally, a certain number of basis elements from each resolution-level may be chosen to generate a matrix of basis elements. This matrix may then be used to capture both coarser and finer structures of a given image. This process is now described in more detail.

In one embodiment of the invention, by letting $c_l^1$ be a compact cupolet of length $2^n$, $c_l^1$, may be viewed as the scaling function for the lowest (i.e., coarsest) resolution-level. That is, in one embodiment, $c_l^1$ may be representing the lowest frequencies in the spectrum of a given signal of length $2^n$. By letting $V^1$ be the closure of the linear space spanned by the vector $c_l^1$, the higher (i.e., finer) resolution-levels $V^j$, $j=2, \ldots, 2^{n-1}$ may then be defined by introducing appropriate versions of the scaling function in each resolution-level.

The scaling functions $c_j^1$, $j=2, \ldots, 2^{n-1}$ may be defined recursively according to an embodiment of the invention. For example, in order to obtain the scaling functions $c_j^1$, the original compact cupolet may be regenerated with a step size $2^{j-1}$ times bigger than the original step size. This may result in a down-sampling of the compact cupolet $c_l^1$. In one embodiment, if the windowed data is of a length $2^n$, the down-sampled compact cupolet may be shifted by $2^{n-j}$ points at a time, thereby producing $2^j$ orthogonal vectors $c_j^1, c_j^2, \ldots, c_j^{2^j}$. Similarly, $V^j$ may be defined to be the linear span of the orthogonal vectors $c_j^1, c_j^2, \ldots, c_j^{2^j}$. This process may provide a total number of n available resolution-levels. In order to approximate a given signal f, up to the k-th resolution-level, for example, a $2^n \times (2^k-1)$ matrix M may be constructed and defined as follows:

$$M = [V^1, V^2, \ldots, V^k].$$

Then, this matrix may be complexified (e.g., as described above with respect to a previous technique), and a column of ones may be inserted at the beginning of the complexified matrix, for example.

Figure 14:
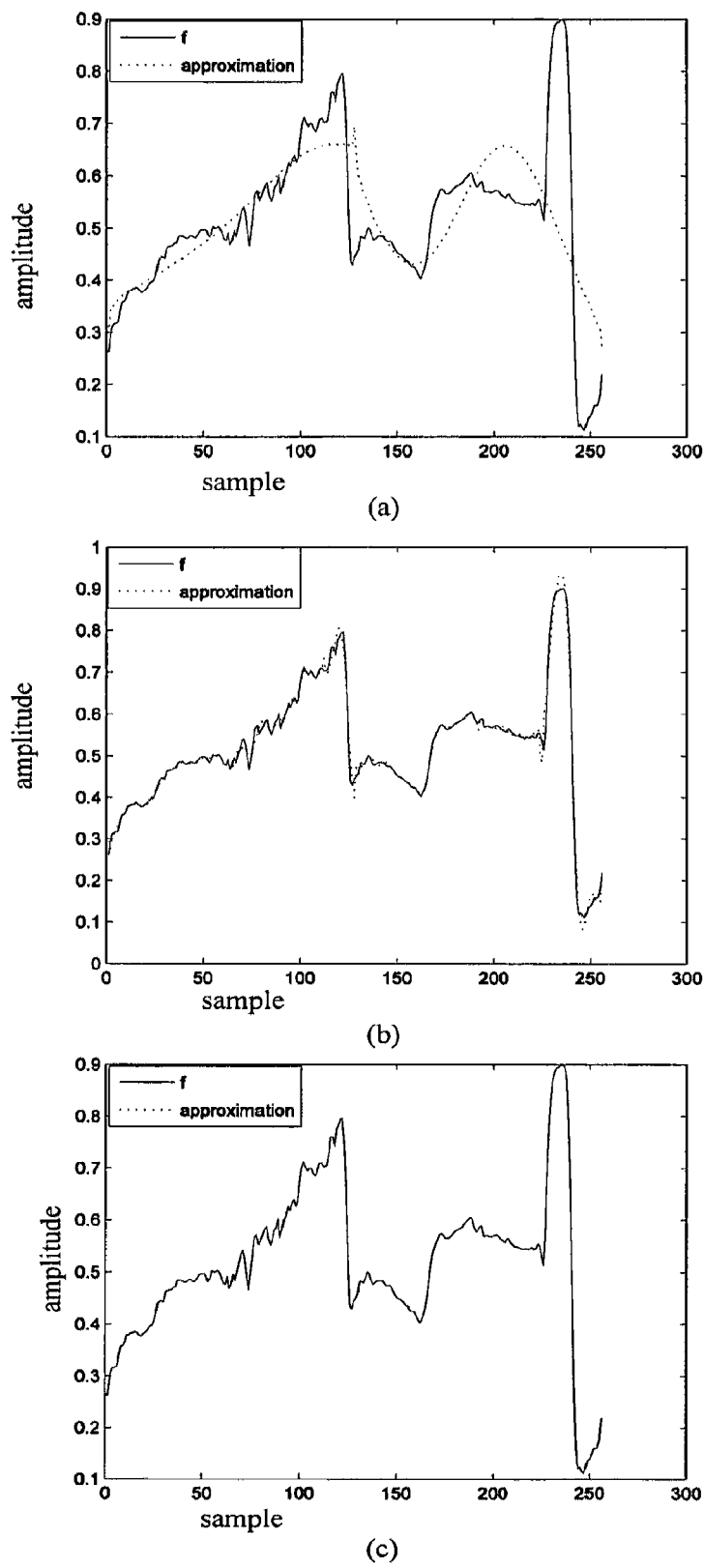
FIG. 14 shows illustrations of approximations of an arbitrary signal using various resolution-levels generated from systems and methods constructed in accordance with the principles of the invention.

FIG. 14, for example, shows the successive approximations of an arbitrary signal f at different resolution-levels using a scaling and shifting technique according to the invention. In one embodiment, the length of the signal may be 256. The approximations of parts (a), (b), and (c) of FIG. 14 may be done up to resolution-levels 3, 5, and 7, respectively, and the number of basis elements in each of these resolution levels is 7, 31, and 127, respectively.

Figure 15:
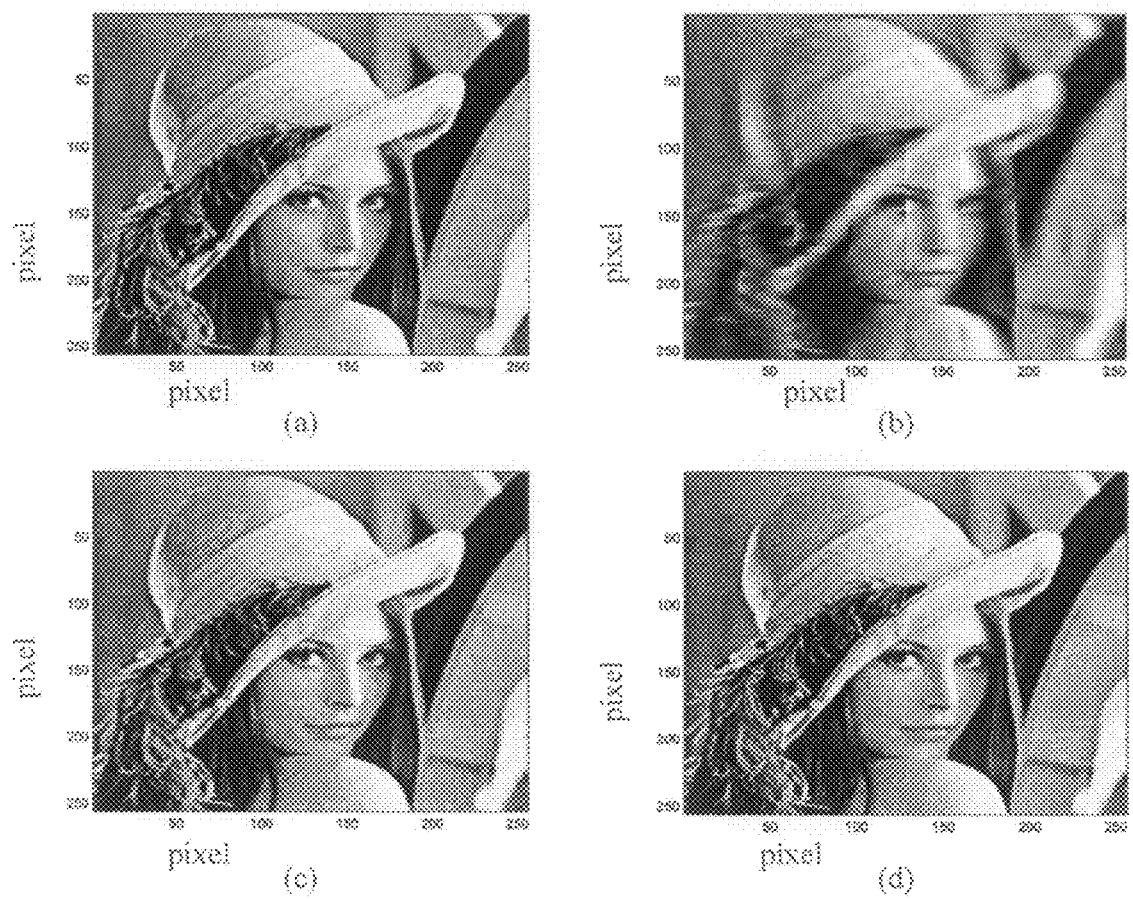
FIG. 15 shows illustrations of an image approximated using various resolution-levels generated from systems and methods constructed in accordance with the principles of the invention.

Similarly, a scaling and shifting technique can be used for compressing an image in accordance with the invention. FIG. 15, for example, shows the successive approximations of a sample image in different resolution-levels (i.e., parts (b), (c), and (d)) along with the original sample image (i.e., part (a)). The size of the original image used is 256×256 pixels and the size of the windowed data is a single scan line or 256 points. The approximations of parts (b), (c), and (d) of FIG. 15 are done in resolution-levels 4, 6, and 7, respectively, and the number of basis elements used in each resolution-level is 15, 63, and 127 per data window, respectively.

While there have been described systems and methods for signal analysis using orbits of a chaotic system, it is to be understood that many changes may be made therein without departing from the spirit and scope of the invention. For example, many other types of orbits besides the specific types of cupolets described above may be used for signal analysis according to the invention, such as any of the tens of thousands of different cupolets that can be produced by any of the various types of chaotic signal generators. Moreover, because compact cupolets can have rich structure and a wide array of oscillatory behaviors, it is to be understood that the most appropriate cupolet for the desired analysis may be chosen by adding one or more pre-selection steps to any of the processes and techniques described above, such that more rapid convergence can be expected, for example. Those skilled in the art will appreciate that the invention can be practiced by other than the described embodiments, which are presented for purposes of illustration rather than of limitation, and the invention is limited only by the claims which follow.

What is claimed is:

1. A method for operating on a cupolet to produce bases for representing a signal, the method comprising:
phase transforming the cupolet into a compact cupolet;
extending the compact cupolet non-periodically over the entire real line by defining the compact cupolet to be zero outside a window of the compact cupolet;
applying a transform to the extended compact cupolet to obtain at least a first basis, wherein the first basis is associated with a first set of one or more basis elements; and
selecting at least one basis element from the first set to approximate the signal at a first resolution level.

2. The method of claim 1 further comprising:
applying a transform to the extended compact cupolet to obtain at least a second basis, wherein the second basis is associated with a second set of one or more basis elements; and
selecting at least one basis element from the second set to approximate the signal at a second resolution level.

3. The method of claim 1 further comprising:
applying a transform to the extended compact cupolet to obtain at least a second basis, wherein the second basis is associated with a second set of one or more basis elements; and
selecting at least two basis elements from the second set to approximate the signal at a second resolution level.

4. The method of claim 1 further comprising:
choosing the cupolet from a plurality of cupolets by comparing a spectrum of each of the plurality of cupolets with a spectrum of the signal.

5. The method of claim 4, wherein the spectrum of each of the plurality of cupolets is a power spectrum.

6. The method of claim 4, wherein the choosing comprises picking the cupolet with the spectrum closest to the spectrum of the signal in a least squares sense.

7. The method of claim 1 further comprising:
before applying the transform, non-linearly phase deforming the compact cupolet with at least one complex parameter.

8. The method of claim 1, wherein the transform is a Walsh-like transform.

9. The method of claim 1, wherein the signal is at least one of an image signal, an audio signal, and a video signal.

10. A method for operating on a cupolet to produce bases for representing a signal, the method comprising:
phase transforming the cupolet into a compact cupolet;
down-sampling the compact cupolet by a factor of the length of a window of the compact cupolet;
padding the down-sampled compact cupolet to have the same length as the length of the window of the compact cupolet;
extending the padded cupolet periodically to the entire real line;
sampling the extended cupolet to obtain at least a first basis, wherein the first basis is associated with a first set of one or more basis elements; and
selecting at least one basis element from the first set to approximate the signal at a first resolution level.

11. The method of claim 10 further comprising:
sampling the extended cupolet to obtain at least a second basis, wherein the second basis is associated with a second set of one or more basis elements; and
selecting at least one basis element from the second set to approximate the signal at a second resolution level.

12. The method of claim 10 further comprising:
sampling the extended cupolet to obtain at least a second basis, wherein the second basis is associated with a second set of one or more basis elements; and
selecting at least two basis elements from the second set to approximate the signal at a second resolution level.

13. The method of claim 10 further comprising:
choosing the cupolet from a plurality of cupolets by comparing a spectrum of each of the plurality of cupolets with a spectrum of the signal.

14. The method of claim 13, wherein the spectrum of each of the plurality of cupolets is a power spectrum.

15. The method of claim 13, wherein the choosing comprises picking the cupolet with the spectrum closest to the spectrum of the signal in a least squares sense.

16. The method of claim 10 further comprising:
before applying the transform, non-linearly phase deforming the compact cupolet with at least one complex parameter.

17. The method of claim 10, wherein the signal is at least one of an image signal, an audio signal, and a video signal.

18. A method for operating on a cupolet to produce bases for representing a signal, the method comprising:
phase transforming the cupolet into a compact cupolet;
down-sampling the compact cupolet by a first factor of the length of a window of the compact cupolet to provide a first down-sampled cupolet;

padding the first down-sampled cupolet to fit in the window of the compact cupolet;

shifting the padded first down-sampled cupolet by the first factor to generate at least a first basis, wherein the first basis is associated with a first set of one or more basis elements; and selecting at least one basis element from the first set to approximate the signal at a first resolution level.

19. The method of claim 18 further comprising:

down-sampling the compact cupolet by a second factor of the length of the window of the compact cupolet to provide a second down-sampled cupolet, wherein the second factor is one of a factor of the first factor and a multiple of the first factor;

padding the second down-sampled cupolet to fit in the window of the compact cupolet;

shifting the padded second down-sampled cupolet by the second factor to generate at least a second basis, wherein the second basis is associated with a second set of one or more basis elements; and selecting at least one basis element from the second set to approximate the signal at a second resolution level.

20. The method of claim 18 further comprising:

down-sampling the compact cupolet by a second factor of the length of the window of the compact cupolet to provide a second down-sampled cupolet, wherein the second factor is one of a factor of the first factor and a multiple of the first factor;

padding the second down-sampled cupolet to fit in the window of the compact cupolet;

shifting the padded second down-sampled cupolet by the second factor to generate at least a second basis, wherein the second basis is associated with a second set of one or more basis elements; and selecting at least two basis elements from the second set to approximate the signal at a second resolution level.

21. The method of claim 19 further comprising:

generating a matrix using the at least one basis element from the first basis and the at least one basis element from the second basis; and using the matrix to approximate the signal at various resolution levels.

22. The method of claim 18 further comprising:

choosing the cupolet from a plurality of cupolets by comparing a spectrum of each of the plurality of cupolets with a spectrum of the signal.

23. The method of claim 22, wherein the spectrum of each of the plurality of cupolets is a power spectrum.

24. The method of claim 22, wherein the choosing comprises picking the cupolet with the spectrum closest to the spectrum of the signal in a least squares sense.

25. The method of claim 18 further comprising:

before applying the transform, non-linearly phase deforming the compact cupolet with at least one complex parameter.

26. The method of claim 18, wherein the signal is at least one of an image signal, an audio signal, and a video signal.

27. The method of claim 1, wherein the window of the compact cupolet is defined over a continuous interval of the real line.

28. The method of claim 1, wherein phase transforming the cupolet into a compact cupolet comprises aligning at least a portion of the frequency components of the cupolet around a single global maximum.

29. The method of claim 28, wherein phase transforming the cupolet into a compact cupolet further comprises phase transforming the compact cupolet into a less-compact cupolet with at least one complex parameter.

30. The method of claim 29, wherein applying the transform comprises using the less-compact cupolet to obtain the at least a first basis.

31. The method of claim 1, wherein phase transforming the cupolet into a compact cupolet comprises aligning all of the frequency components of the cupolet around a single global maximum.

* * * * *